(12) United States Patent
Asakura et al.

(10) Patent No.: US 8,691,351 B2
(45) Date of Patent: Apr. 8, 2014

(54) ANTIREFLECTION FILM, POLARIZING PLATE AND IMAGE DISPLAY DEVICE

(75) Inventors: Tetsuya Asakura, Minami-Ashigara (JP); Takato Suzuki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 504 days.

(21) Appl. No.: 12/051,654

(22) Filed: Mar. 19, 2008

(65) Prior Publication Data

US 2008/0239488 A1    Oct. 2, 2008

(30) Foreign Application Priority Data

Mar. 20, 2007  (JP) ................. P2007-072910

(51) Int. Cl.
*C09K 19/00*    (2006.01)

(52) U.S. Cl.
USPC ............ 428/1.3; 428/1.1; 428/331; 428/336; 428/429; 428/441; 359/601; 359/586

(58) Field of Classification Search
USPC ............ 428/1, 328, 329, 331, 336, 1.31, 451, 428/1.1, 1.3, 429, 441; 359/614, 601, 586
See application file for complete search history.

(56) References Cited

U.S. PATENT DOCUMENTS

| | | | |
|---|---|---|---|
| 5,194,990 A | | 3/1993 | Boulos et al. |
| 2002/0018886 A1* | | 2/2002 | Matsufuji et al. ............ 428/328 |
| 2002/0060849 A1* | | 5/2002 | Matsunaga et al. .......... 359/614 |
| 2005/0181146 A1* | | 8/2005 | Yoneyama et al. ......... 428/1.31 |
| 2006/0198021 A1* | | 9/2006 | Fukuda et al. ............... 359/490 |

FOREIGN PATENT DOCUMENTS

| | | |
|---|---|---|
| JP | 3034044 B2 | 4/2000 |
| JP | 2003-121606 A | 4/2003 |
| JP | 2005-283730 A | 10/2005 |
| JP | 2006283730 A  * | 10/2006 |
| WO | WO-2006/033456 A1 | 3/2006 |

OTHER PUBLICATIONS

Tikhonravov et al., Applied Optics, vol. 32, No. 22, Aug. 1, 1993, XP 000383251, pp. 4265-4275.
Mouchart, Applied Optics, vol. 16, No. 10, Oct. 1, 1997, XP-002319481, pp. 2722-2728.
Thetford, Optica ACTA, Jan. 1, 1969, vol. 16, No. 1, XP009038632, pp. 37-43.
Japanese Office Action dated May 8, 2012, for corresponding Japanese Application No. 2008-070230, with an English translation.
Taiwanese Office Action, dated Sep. 17, 2013, for Patent Application No. 097109608.

* cited by examiner

*Primary Examiner* — Gwendolyn Blackwell
*Assistant Examiner* — Ruiyun Zhang
(74) *Attorney, Agent, or Firm* — Birch, Stewart, Kolasch & Birch, LLP

(57) ABSTRACT

An antireflection film includes, in a following order, a transparent substrate film; a medium refractive index layer; a high refractive index layer; and a low refractive index layer, wherein the medium refractive index layer is (A) a medium refractive index layer having a refractive index of 1.60 to 1.64 at a wavelength of 550 nm and a thickness of 55.0 to 65.0 nm, the high refractive index layer is (B) a high refractive index layer having a refractive index of 1.70 to 1.74 at a wavelength of 550 nm and a thickness of 105.0 to 115.0 nm, and the low refractive index layer is (C) a low refractive index layer having a refractive index of 1.32 to 1.37 at a wavelength of 550 nm and a thickness of 85.0 to 95.0 nm.

15 Claims, 1 Drawing Sheet

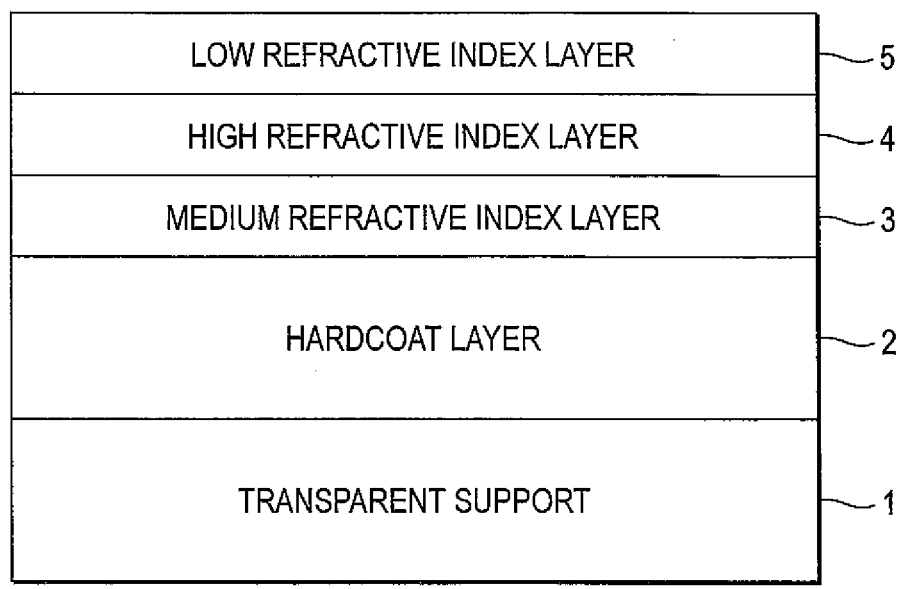

ANTIREFLECTION FILM, POLARIZING PLATE AND IMAGE DISPLAY DEVICE

BACKGROUND OF THE INVENTION

1. Field of the Invention

The present invention relates to an antireflection film, a polarizing plate using the antireflection film, and an image display device using the antireflection film or polarizing plate. More specifically, the present invention relates to an antireflection film enabling to prevent the visibility at a high level from worsening due to projection of reflected light, causing less reduction in the display quality, hardly allowing point defects or scratches to be perceived, and having good durability.

2. Description of the Related Art

In various image display devices such as liquid crystal display device (LCD), plasma display panel (PDP), electroluminescent display (ELD) and cathode ray tube display device (CRT), an antireflection film is disposed on the display surface so as to prevent the reduction in contrast due to reflection of outside light or projection of figure. Accordingly, the antireflection film is required to have not only high antireflection performance but also high transmittance, high physical strength (e.g., scratch resistance), chemical resistance, and weather resistance (e.g., resistance against humidity, heat or light).

In such an antireflection film, a low refractive index layer which is a thin-film layer of 200 nm or less in thickness is provided at least on the outermost surface, and reflection is prevented by the effect of optical interference of the low refractive index layer. However, in the case of a one-layer thin-film interference type of preventing reflection by one low refractive index layer which is a simplest configuration, a practically usable low refractive index material satisfying a reflectance of 0.5% or less and at the same time, having neutral color tint, high scratch resistance, chemical resistance and weather resistance is not present. In order to achieve a reflectance of 0.5% or less, there is known a multilayer thin-film interference-type antireflection film for preventing reflection by the effect of optical interference of multiple layers, such as a two-layer thin-film interference type where a high refractive index layer is formed between the transparent support and the low refractive index layer, and a three-layer thin-film interference type where a medium refractive index layer and a high refractive index layer are sequentially formed between the transparent support and the low refractive index layer. In particular, for preventing reflection in a wide wavelength range and achieving a low reflectance while suppressing the reflected color, a three-layer thin-film interference type is preferred.

As for the thin-film layer (e.g., high refractive index layer, medium refractive index layer, low refractive index layer) used in the multilayer thin-film interference-type antireflection film, a multilayer film where a transparent thin-film layer of metal oxide is stacked is heretofore widely used. The transparent thin film of metal oxide is usually formed by a chemical vapor deposition (CVD) method or a physical vapor deposition (PVD) method, particularly, by a vacuum vapor deposition method or a sputtering method which are a kind of the physical vapor deposition method.

However, the method of forming a transparent thin film of metal oxide by vapor deposition or sputtering is not suited for mass production because of its low productivity, and a formation method by a wet film-forming method with high productivity, particularly, a coating system, is proposed.

In the case of producing an antireflection film by a coating system, a coating composition prepared by dissolving or dispersing a film-forming composition having a specific refractive index in a solvent is coated on a substrate, dried and, if desired, cured, whereby a single-layer or multilayer thin-film layer can be formed. In the case of a single layer, it may suffice if a layer having a refractive index lower than that of the substrate (low refractive index layer) is formed to, in terms of optical layer thickness, a thickness of about ¼ of the designed wavelength. When more reduction of reflection is required, it is known to form a layer having a refractive index higher than that of the substrate (high refractive index layer) between the substrate and the layer having a low refractive index (see, for example, Japanese Patent No. 3034044).

Such a multilayer-type antireflection film can reduce the reflection, but when the thickness of each layer fluctuates, the reflected color is changed. For example, in the wet coating, although this may vary depending on the coating system, it is very difficult to form an optical interference thin film in thickness of approximately from 50 to 150 mm with good precision. Usually, thickness unevenness of 5 to 10 nm is generated and there arises a problem that reflected color corresponding to the unevenness is observed or a failure such as coating streak is liable to be highly visible. In order to solve such a problem, efforts are being made to reduce the thickness unevenness of the formed film coating by adjusting the viscosity of the coating solution or devising the coating apparatus. Furthermore, for example, JP-A-2003-121606 (the term "JP-A" as used herein means an "unexamined published Japanese patent application") discloses an antireflection film where the wavelength dependency of reflectance and in turn the change of color tint are reduced by restricting the thickness and refractive index of each layer to specific ranges.

However, with the refractive index of each layer described in Examples of JP-A-2003-121606, the change of reflected color due to fluctuation in the thickness of each layer is still large, and more improvement is demanded.

In other words, conventionally proposed antireflection films cannot sufficiently respond at the fluctuation in thickness of each layer in terms of satisfying both the reduction of reflection and the suppression of change in the reflected color, and development of an antireflection film satisfying both of these properties is demanded.

SUMMARY OF THE INVENTION

The present invention provides an antireflection film satisfying the reduction of reflection, causing less change in the reflected color due to fluctuation in the thickness of each layer of the antireflection film, and enabling to enhance the productivity by decreasing the difference in reflected color among finished products or hardly allowing the coating unevenness or streak to be perceived. The present invention further provides an antireflection film assured of good neutral property and less projection of outside light. The present invention still further provides a polarizing plate and a liquid crystal display device each using the antireflection film and having the above-described effects.

As a result of intensive studies to solve those problems, the present inventors have found that the above-described objects can be achieved by setting the refractive index and thickness of each layer to fall in the range of a specific relational formula and also found that by virtue of setting the refractive index and thickness of each layer to fall in a specific range, when an inorganic fine particle is further incorporated into the low refractive index layer, a remarkable effect is obtained. The present invention has been accomplished based on these findings.

That is, the present invention provides an antireflection film, a polarizing plate and an image display device each having the following constructions.

<1> An antireflection film comprising, in a following order:
a transparent substrate film;
a medium refractive index layer;
a high refractive index layer; and
a low refractive index layer,
wherein
the medium refractive index layer is (A) a medium refractive index layer having a refractive index of 1.60 to 1.64 at a wavelength of 550 nm and a thickness of 55.0 to 65.0 nm,
the high refractive index layer is (B) a high refractive index layer having a refractive index of 1.70 to 1.74 at a wavelength of 550 nm and a thickness of 105.0 to 115.0 nm, and
the low refractive index layer is (C) a low refractive index layer having a refractive index of 1.32 to 1.37 at a wavelength of 550 nm and a thickness of 85.0 to 95.0 mm.

<2> The antireflection film as described in <1>, wherein the low refractive index layer comprises at least one kind of inorganic fine particle.

<3> The antireflection film as described in <1>, wherein the low refractive index layer comprises at least one kind of hollow particle having a refractive index of 1.17 to 1.40.

<4> The antireflection film as described in <1>, wherein the low refractive index layer is a layer formed by curing a composition that comprises a fluorine-containing curable resin having a heat-curable or/and ionizing radiation-curable property.

<5> The antireflection film as described in <1>, wherein the low refractive index layer is a layer formed by curing a composition that comprises at least either a hydrolysate of an organosilyl compound or a partial condensate of the hydrolysate, the origanosilyl compound being represented by a following formula (1):

$$R^{11}{}_m Si(X^{11})_n \qquad \text{Formula (I)}$$

wherein
$X^{11}$ represents —OH, a halogen atom, an —$OR^{12}$ group or an —$OCOR^{12}$ group,
$R^{11}$ represents an alkyl group, an alkenyl group or an aryl group,
$R^{12}$ represents an alkyl group,
m+n is 4, and
m and n each is a positive integer.

<6> The antireflection film as described in <1>, wherein at least one layer of the high refractive index layer and the medium refractive index layer is formed by
coating a coating composition that comprises an inorganic fine particle containing an oxide of at least one metal selected from the group consisting of Ti, Zr, In, Zn, Sn, Sb and Al; a curable resin having a trifunctional or greater polymerizable group; a solvent; and a polymerization initiator,
drying the solvent, and
curing the coating composition by either one or both of heating and irradiation with ionizing radiation.

<7> The antireflection film as described in <6>, wherein the inorganic fine particle contained in at least one layer of the high refractive index layer and the medium refractive index layer mainly comprises a zirconium oxide having an average particle diameter of 1 nm to 120 nm.

<8> The antireflection film as described in <1>, wherein at least one layer of the medium refractive index layer, the high refractive index layer and the low refractive index layer is an electrically conductive layer having a resistance value (SR) satisfying a following formula (4):

$$\text{Log } SR \leq 12. \qquad \text{Formula (4)}$$

<9> The antireflection film as described in <1>, further comprising:
an electrically conductive layer between the transparent support and the medium refractive index layer, which has a resistance value (SR) satisfying a following formula (4):

$$\text{Log } SR \leq 12. \qquad \text{Formula (4)}$$

<10> The antireflection film as described in <1>, further comprising:
a hardcoat layer having a thickness of 1 μm to 30 μm between the transparent support and the medium refractive index layer.

<11> A polarizing plate comprising:
a polarizer; and
two surface protective films, between which the polarizer is sandwiched,
wherein one of the two surface protective films is the antireflection film as described in <1>.

<12> The polarizing plate as described in <11>, wherein the other one of the two surface protective films is an optically compensatory film.

<13> An image display device comprising:
the antireflection film as described in <I>.

<14> An image display device comprising:
the polarizing plate as described in <11>,
wherein the image display device is a TN-, STN-, VA-, ECB-, IPS- or OCB-mode transmissive, reflective or transflective liquid crystal display device.

BRIEF DESCRIPTION OF THE DRAWING

FIGURE illustrates a cross-sectional view schematically showing the layer construction of the antireflection film of the present invention.

DETAILED DESCRIPTION OF THE INVENTION

The present invention is described in detail below.

The expression "from (numerical value A) to (numerical value B)" as used for indicating a physical value, a characteristic value or the like means "numerical value A or more and numerical value B or less". Also, the term "(meth)acryloyl" means "acryloyl, methacryloyl or both". The same applies to "(meth)acrylate", "(meth)acrylic acid" and "(meth)acrylamide".

The antireflection film of the present invention comprises a transparent substrate film (hereinafter sometimes referred to as a "transparent support") having stacked thereon a medium refractive index layer, a high refractive index layer and a low refractive index layer in this order from the transparent substrate film side and characterized in that each layer satisfies a specific relational formula.

[Construction of Antireflection Film]

The fundamental construction of the antireflection film suitable as one embodiment of the present invention is described below by referring to the drawing.

The drawing is a cross-sectional view schematically showing one preferred embodiment of the antireflection film of the present invention.

The antireflection film shown in the drawing is a three-layer thin-film interference-type antireflection film having excellent antireflection performance, where the antireflection film comprises a transparent support 1 and comprises as thin-film layers a low refractive index layer 5 located on one surface of the transparent 1 and a high refractive index layer 4 having a refractive index higher than that of the low refractive index layer, between the low refractive index layer 5 and the transparent support 1. Furthermore, a medium refractive index layer 3 as a thin-film layer (hereinafter, when simply referred to as a "thin-film layer", this indicates these low refractive index layer, high refractive index layer and medium refractive index layer) is provided between the high refractive index layer 4 and the transparent support 1. Also, a hardcoat layer 2 is provided between the medium refractive index layer 3 and the transparent support 1.

In this embodiment, the transparent support 1, the medium refractive index layer 3, the high refractive index layer 4 and the low refractive index layer 5 have refractive indexes satisfying the following relationship.

Refractive index of high refractive index layer>refractive index of medium refractive index layer>refractive index of transparent support>refractive index of low refractive index layer.

Furthermore, in the present invention, with respect to the designed wavelength λ (=550 nm, representative of the wavelength region giving highest visibility), it is preferable that the medium refractive index layer satisfies the following formula (I), the high refractive index layer satisfies the following formula (II), and the low refractive index layer satisfies the following formula (III):

$$\lambda/4 \times 0.68 < n^1 d^1 < \lambda/4 \times 0.74 \quad \text{Formula (I)}$$

$$\lambda/2 \times 0.66 < n^2 d^2 < \lambda/2 \times 0.72 \quad \text{Formula (II)}$$

$$\lambda/4 \times 0.84 < n^3 d^3 < \lambda/4 \times 0.92 \quad \text{Formula (III)}$$

(wherein $n^1$ is the refractive index of the medium refractive index layer, $d^1$ is the thickness (nm) of the medium refractive index layer, $n^2$ is the refractive index of the high refractive index layer, $d^2$ is the thickness (nm) of the high refractive index layer, $n^3$ is the refractive index of the low refractive index layer, $d^3$ is the thickness (nm) of the low refractive index layer, and $n^3 < n^1 < n^2$).

It is preferable that formulae (I), (II) and (III) are satisfied, because the reflectance is reduced and the change of reflected color is suppressed.

In the present invention, with respect to these medium refractive index layer, high refractive index layer and low refractive index layer, it is preferred that, the medium refractive index layer is (A) a medium refractive index layer having a refractive index of 1.60 to 1.64 at the wavelength of 550 mm and a thickness of 55.0 to 65.0 nm, the high refractive index layer is (B) a high refractive index layer having a refractive index of 1.70 to 1.74 at the wavelength of 550 nm and a thickness of 105.0 to 115.0 nm, and the low refractive index layer is (C) a low refractive index layer having a refractive index of 1.32 to 1.37 at the wavelength of 550 nm and a thickness of 85.0 to 95.0 nm.

By setting the refractive indexes and the thicknesses of the respective layer to be within the ranges, the fluctuation of reflected color can be reduced further, thus preferred.

The low refractive index layer preferably contains at least one kind of an inorganic fine particle. This is described later, but when the above-described relational formulae, the above-described refractive indexes and layer thicknesses, and the incorporation of an inorganic fine particle into the low refractive index layer all are satisfied, excellent scratch resistance is afforded in addition to various objects of the present invention, and this is useful particularly in that the desired effect of the present invention is obtained.

In the present invention, a hardcoat layer may not be provided but as in this embodiment, a hardcoat layer is preferably provided because the film becomes strong in view of scratch resistance by a pencil scratch test or the like. Also, an electrically conductive layer may be provided between the transparent support and the hardcoat layer separately from the medium refractive index layer or high refractive index layer, and the medium refractive index layer or high refractive index layer may be formed as an electrically conductive layer having electrical conductivity.

The color tint of regularly reflected light for 5° incident light in the wavelength region of 380 to 780 nm of a CIE standard illuminant D65 preferably satisfies the conditions that a* and b* values of the CIE1976 L*a*b* color space are in the range of $0 \leq a^* \leq 8$ and $-10 \leq b^* \leq 0$ and within this color tint fluctuation range, the color difference ΔE due to 2.5% fluctuation in the thickness of an arbitrary layer out of those layers falls in the range of the following formula (5), because reflected light with good neutral property is obtained, the reflected color does not differ among finished products, and the coating streak or unevenness is hardly perceived.

$$\Delta E = \{(L^* - L^{*\prime})^2 + (a^* - a^{*\prime})^2 + (b^* - b^{*\prime})^2\}^{1/2} \leq 3 \quad \text{Formula (5)}$$

($L^{*\prime}$, $a^{*\prime}$ and $b^{*\prime}$ are the color tint of reflected light with the designed thickness).

Also, in the case of disposing the antireflection film on the surface of an image display device, the average specular reflectance is preferably 0.5% or less, whereby projection can be remarkably reduced.

For controlling the refractive index of the high refractive index layer, as described layer, an inorganic fine particle is preferably used, but the titanium dioxide particle often used in this art has a photocatalytic activity and sometimes causes a bad effect in view of suitability for production or durability by incurring a problem such as worsening of light resistance. The present inventors have found that when the refractive index of the high refractive index layer is in the above-described range, an inorganic fine particle having a refractive index lower than that of the titanium dioxide particle, for example, a zirconium oxide particle, can be used and there arises no problem in view of suitability for production or durability.

As for the measurement of specular reflectivity and color tint, the antireflection property can be evaluated by mounting an adapter "ARV-474" on a spectrophotometer "V-550" (manufactured by JASCO Corp.), measuring the specular reflectivity for the outgoing angle of −θ at an incident angle of θ (θ: from 5 to 45°, in steps of 5°) in the wavelength region of 380 to 780 nm, and calculating the average reflectivity at 450 to 650 nm. Furthermore, the color tint of reflected light can be evaluated by calculating, from the reflection spectrum measured, the L*, a* and b* values of the CIE1976 L*a*b* color space, which are values indicating the color tint of regularly reflected light for incident light at each incident angle of a CIE standard illuminant $D_{65}$.

The refractive index of each layer can be measured using Multi-Wavelength Abbe Refractometer DR-M2 (manufactured by ATAGO Co., Ltd.) after applying the coating solution for each layer onto a glass plate to a thickness of 3 to 5 μm. In the present specification, a refractive index measured using a filter, "Interference Filter 546(e) nm for DR-M2, M4, Parts No. RE-3523", is employed as the refractive index at a wavelength of 550 nm.

The film thickness of each layer can be measured by observing the cross-section by means of a reflection spectroscopy film thickness meter "FE-3000 (manufactured by Otsuka Electronics Co., Ltd.) utilizing light interference or a TEM (transmission electron microscope). The refractive index can be measured simultaneously with the film thickness also by the reflection spectroscopy film thickness meter, but in order to increase the measurement accuracy of film thickness, a refractive index of each layer measured by a different device is preferably used. In the case where the refractive index of each layer cannot be measured, the measurement of film thickness by TEM is preferred. In this case, it is preferred to measure the film thickness at 10 or more portions and use the average value thereof.

The antireflection film of the present invention preferably takes a form, in terms of a form at the production, of the film being taken up into a roll. In this case, in order to obtain color neutrality of the reflected color, the layer thickness distribution value calculated by the following formula (6) with the parameters being the average d (average value), minimum d (minimum value) and maximum d (maximum value) of the layer thickness in the range of an arbitrary 1,000-m length is preferably 5% or less, more preferably 4% or less, still more preferably 3% or less, yet still more preferably 2.5% or less, even yet still more preferably 2% or less, in each layer of thin-film layers.

$$(\text{maximum } d - \text{minimum } d) \times 100 / \text{average } d \qquad \text{Formula (6)}$$

The layers constituting the antireflection film of the present invention are described in detail below.

[Transparent Substrate Film]

The transparent substrate film used as the transparent support for the antireflection film of the present invention may be a transparent resin film, a transparent resin plate, a transparent resin sheet, a transparent glass or the like and is not particularly limited. Examples of the transparent resin film include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, a polyacrylate-based resin film, a polyurethane-based resin film, a polyester film, a polycarbonate film, a polysulfone film, a polyether film, a polymethylpentene film, a polyether ketone film, a (meth)acrylnitrile film, a polyolefin, and a polymer having an alicyclic structure (such as norbornene-based resin (ARTON, trade name, produced by JSR Corp.) and amorphous polyolefin (ZEONEX, trade name, produced by Zeon Corp.)). Among these, preferred are triacetyl cellulose, polyethylene terephthalate and a polymer having an alicyclic structure, and more preferred is triacetyl cellulose.

The thickness of the transparent support may be usually on the order of 25 to 1,000 μm but is preferably from 25 to 250 μm, more preferably from 30 to 90 μm.

The width of the transparent support may be arbitrarily selected but in view of handling, yield and productivity, the width is usually from 100 to 5,000 mm, preferably from 800 to 3,000 mm, more preferably from 1,000 to 2,000 mm. The transparent support can be handled as a lengthy film in the roll form, and the length is usually from 100 to 5,000 m, preferably from 500 to 3,000 m.

The surface of the transparent support is preferably smooth and preferably has an average roughness Ra value of 1 μm or less. The average roughness value is preferably from 0.0001 to 0.5 μm, more preferably from 0.001 to 0.1 μm.

<Cellulose Acylate Film>

Out of those various films, a cellulose acylate film assured of high transparency, less optical birefringence and easy production and commonly used as a polarizing plate protective film is preferred.

As regards the cellulose acylate film, various techniques for improving mechanical property, transparency, planarity and the like are known, and the techniques described in *JIII Journal of Technical Disclosure*, No. 2001-1745 can be used in the present invention.

In the present invention, among cellulose acylate films, a cellulose triacetate film is preferred, and a cellulose acetate having an acetylation degree of 59.0 to 61.5% is preferably used for the cellulose acylate film. The acetylation degree means the amount of acetic acid bonded per unit mass of cellulose. The acetylation degree is determined according to the measurement and calculation of acetylation degree in ASTM:D-817-91 (Test Method of Cellulose Acetate, etc.).

The viscosity average polymerization degree (DP) of the cellulose acylate is preferably 250 or more, more preferably 290 or more.

Also, in the cellulose acylate for use in the present invention, the Mw/Mn (Mw is the mass average molecular weight and Mn is the number average molecular weight) value by gel permeation chromatography is preferably close to 1.0, in other words, the molecular weight distribution is preferably narrow. Specifically, the Mw/Mn value is preferably from 1.0 to 1.7, more preferably from 1.3 to 1.65, and most preferably from 1.4 to 1.6.

In general, the hydroxyl groups at the 2-, 3- and 6-positions of the cellulose acylate are not evenly distributed in ⅓ portions of the entire substitution degree, but the substitution degree of the hydroxyl group at the 6-position tends to be small. In the present invention, the substitution degree of the hydroxyl group at the 6-position of the cellulose acylate is preferably larger than those at the 2-position and 3-position.

The hydroxyl group at the 6-position, which is substituted by an acyl group, preferably accounts for 32% or more, more preferably 33% or more, still more preferably 34% or more, based on the entire substitution degree. Furthermore, the substitution degree of the acyl group at the 6-position of the cellulose acylate is preferably 0.88 or more. The hydroxyl group at the 6-position may be substituted by an acyl group having a carbon number of 3 or more, such as propionyl group, butyroyl group, valeroyl group, benzoyl group or acryloyl group, other than an acetyl group. The substitution degree at each position can be determined by NMR.

As regards the cellulose acylate for use in the present invention, cellulose acetates obtained by the methods described in JP-A-11-5851, "Example" and "Synthesis Example 1" of paragraphs [0043] and [0044], "Synthesis Example 2" of paragraphs [0048] and [0049], and "Synthesis Example 3" of paragraphs [0051] and [0052], can be used.

<Production of Cellulose Acylate Film>

The cellulose acylate film for use in the present invention can be produced by a solution film-forming method (solvent casting method). In the solvent casting method, the film is produced using a solution (dope) obtained by dissolving cellulose acylate in an organic solvent.

The organic solvent preferably contains a solvent selected from an ether having a carbon number of 3 to 12, a ketone having a carbon number of 3 to 12, an ester having a carbon number of 3 to 12, and a halogenated hydrocarbon having a carbon number of 1 to 6. Two or more kinds of organic solvents may be mixed and used.

The ether, ketone and ester each may have a cyclic structure. A compound having any two or more functional groups of the ester, ketone and ether (that is, —O—, —CO— and —COO—) may also be used as the organic solvent. The organic solvent may have another functional group such as alcoholic hydroxyl group. In the case of an organic solvent having two or more kinds of functional groups, the number of carbon atoms is preferably within the range specified for the solvent having any one of the functional groups.

Examples of the ethers having a carbon number of 3 to 12 include diisopropyl ether, dimethoxymethane, dimethoxyethane, 1,4-dioxane, 1,3-dioxolane, tetrahydrofuran, anisole and phenetole.

Examples of the ketones having a carbon number of 3 to 12 include acetone, methyl ethyl ketone, diethyl ketone, diisobutyl ketone, cyclohexanone and methylcyclohexanone.

Examples of the esters having a carbon number of 3 to 12 include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The number of carbon atoms in the halogenated hydrocarbon is preferably 1 or 2 and most preferably 1. The halogen of the halogenated hydrocarbon is preferably chlorine. The proportion at which the hydrogen atom of the hydrogenated hydrocarbon is substituted by a halogen is preferably from 25 to 75 mol %, more preferably from 30 to 70 mol %, still more preferably from 35 to 65 mol %, and most preferably from 40 to 60 mol %. A representative halogenated hydrocarbon is methylene chloride.

A cellulose acylate solution (dope) can be prepared by a general method. The general method means a processing performed at a temperature of 0° C. or more (ordinary temperature or high temperature). The preparation of the solution can be performed using a method and an apparatus for dope preparation in the normal solvent casting method. In the case of a general method, a halogenated hydrocarbon (particularly, methylene chloride) is preferably used as the organic solvent. A chlorine-free solvent may also be used, and examples thereof include those described in *JIII Journal of Technical Disclosure*, No. 2001-1745.

The amount of the cellulose acylate is adjusted to occupy from 10 to 40 mass % in the solution obtained. The amount of the cellulose acylate is preferably from 10 to 30 mass %. An arbitrary additive described later may be previously added in the organic solvent (main solvent).

The solution can be prepared by stirring a cellulose acylate and an organic solvent at an ordinary temperature (from 0 to 40° C.). A solution in a high concentration may be stirred under pressure and heating. Specifically, a cellulose acylate and an organic solvent are charged into a pressure vessel and after sealing the vessel, the mixture is stirred under pressure while heating it at a temperature in the range from a temperature not less than the boiling point of the solvent at ordinary temperature to a temperature not allowing for boiling of the solvent. The heating temperature is usually 40° C. or more, preferably from 60 to 200° C., more preferably from 80 to 110° C.

The components may be previously roughly mixed and then charged into the vessel or may be successively charged into the vessel.

The vessel needs to be constructed so that stirring can be performed. The vessel may be pressurized by injecting an inert gas such as nitrogen gas. Also, the increase in vapor pressure of the solvent due to heating may be utilized. Alternatively, the components may be added under pressure after sealing the vessel.

In the case of performing heating, the heating is preferably applied from outside of the vessel. For example, a jacket-type heating device may be used. Also, the entire vessel may be heated by providing a plate heater outside of the vessel, laying a piping system and circulating a liquid.

The stirring is preferably performed using a stirring blade by providing the stirring blade inside the vessel. A stirring blade having a length long enough to reach near the wall of the vessel is preferred. The tip of the stirring blade is preferably equipped with a scraping blade for renewing the liquid film on the wall of the vessel.

The vessel may be equipped with measuring meters such as pressure gauge and thermometer. The components are dissolved in a solvent within the vessel. The dope prepared is cooled and then taken out of the vessel, or the dope is taken out of the vessel and then cooled using a heat exchanger or the like.

The solution may also be prepared by a cooling dissolution method. According to the cooling dissolution method, the cellulose acylate can be dissolved even in an organic solvent where cellulose acylate can be hardly dissolved by an ordinary dissolution method. Incidentally, the cooling dissolution method has an effect that a uniform solution can be rapidly obtained also with a solvent which can dissolve cellulose acylate by an ordinary dissolution method.

In the cooling dissolution method, first, a cellulose acylate is gradually added to an organic solvent with stirring at room temperature.

The amount of the cellulose acylate is preferably adjusted to occupy from 10 to 40 mass % in the mixture. The amount of the cellulose acylate is more preferably from 10 to 30 mass %. Furthermore, an arbitrary additive described later may be previously added in the mixture.

Next, the mixture is cooled to −100 to −10° C. (preferably from −80 to −10° C., more preferably from −50 to −20° C., and most preferably from −50 to −30° C.). The cooling can be performed, for example, in a dry ice-methanol bath (−75° C.) or a cooled diethylene glycol solution (from −30 to −20° C.). By this cooling, the mixture of cellulose acylate and organic solvent is solidified.

The cooling rate is preferably 4° C./min or more, more preferably 8° C./min or more, and most preferably 12° C./min or more. The cooling rate is preferably higher, but the theoretical upper limit is 10,000° C./sec, the technical upper limit is 1,000° C./sec, and the practical upper limit is 100° C./sec. Incidentally, the cooling rate is a value obtained by dividing the difference between the temperature at the beginning of cooling and the final cooling temperature by the time spent from the beginning of cooling until reaching the final cooling temperature.

Furthermore, when the cooled mixture is heated to 0 to 200° C. (preferably from 0 to 150° C., more preferably from 0 to 120° C., and most preferably from 0 to 50° C.), the cellulose acylate dissolves in the organic solvent. The temperature may be elevated by allowing the mixture to stand at room temperature or by the heating in a warm bath.

The heating rate is preferably 4° C./min or more, more preferably 8° C./min or more, and most preferably 12° C./min or more. The heating rate is preferably higher, but the theoretical upper limit is 10,000° C./sec, the technical upper limit is 1,000° C./sec, and the practical upper limit is 100° C./sec. Incidentally, the heating rate is a value obtained by dividing the difference between the temperature at the beginning of heating and the final heating temperature by the time spent from the beginning of heating until reaching the final heating temperature.

In this way, a uniform solution is obtained. In the case where dissolution is insufficient, the operation of cooling and heating may be repeated. Whether dissolution is sufficient or not can be judged only by observing the outer appearance of the solution with an eye.

In the cooling dissolution method, a closed vessel is preferably used so as to avoid intermingling of water due to dew condensation at the cooling. Also, in the cooling and heating operation, when a pressure is applied at the cooling and the pressure is reduced at the heating, the dissolution time can be shortened. For applying pressure and reducing pressure, a pressure vessel is preferably used.

Incidentally, in a 20 mass % solution obtained by dissolving a cellulose acetate (acetylation degree: 60.9%, viscosity average polymerization degree: 299) in methyl acetate by the cooling dissolution method, according to the measurement by a differential scanning calorimeter (DSC), a pseudo phase transition point between a sol state and a gel state is present in the vicinity of 33° C., and the solution comes into a uniform gel state at a temperature not more than this temperature. Accordingly, the solution needs to be kept at a temperature not lower than the pseudo phase transition temperature, preferably at a temperature of the gel phase transition temperature plus about 10° C. However, this pseudo phase transition temperature varies depending on the acetylation degree, viscosity average polymerization degree and solution concentration of cellulose acetate or the organic solvent used.

A cellulose acylate film is produced from the prepared cellulose acylate solution (dope) by a solvent casting method.

The dope is cast on a drum or a band, and the solvent is evaporated to form a film. The concentration of the dope before casting is preferably adjusted to have a solid content of 18 to 35%.

The surface of the drum or band is preferably finished in a mirror state. The casting and drying methods in the solvent casting method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614 and JP-B-62-115035.

The dope is preferably cast on a drum or band at a surface temperature of 10° C. or less.

The dope is preferably dried by blowing air within 2 seconds after the casting. The obtained film is separated from the drum or band and may be further dried with hot air by sequentially changing the temperature from 100° C. to 160° C. to evaporate the residual solvent. This method is described in JP-B-5-17844. According to this method, the time from casting until separation can be shortened. In order to practice this method, the dope needs to be gelled at the surface temperature of the drum or band during casting.

The film may also be produced using a plurality of prepared cellulose acylate solutions (dopes) by casting two or more layers according to the solvent casting method. In this case, the dope is cast onto a drum or a band and the solvent is evaporated to form a film. The concentration of the dope before casting is preferably adjusted to have a solid content of 10 to 40 mass %. The surface of the drum or band is preferably finished in a mirror state.

In the case of casting the cellulose acetate solution in a plurality of layers of two or more layers, a plurality of cellulose acetate solutions can be cast, and respective cellulose acylate-containing solutions may be cast from a plurality of casting ports provided at intervals in the transparent support travelling direction to produce a film while stacking layers one on another. The methods described, for example, in JP-A-61-158414, JP-A-1-122419 and JP-A-11-198285 may be applied. The film formation may also be performed by casting the cellulose acetate solution from two casting ports, and this can be practiced by the method described, for example, in JP-B-60-27562, JP-A-61-94724, JP-A-61-104813, JP-A-61-158413 and JP-A-6-134933. In addition, the casting method of a cellulose acetate film described in JP-A-56-162617 may also be used, where a flow of a high-viscosity cellulose acetate solution is enveloped with a low-viscosity cellulose acetate solution and the high-viscosity and low-viscosity cellulose acetate solutions are simultaneously extruded.

Alternatively, the film may be produced using two casting ports by separating the film cast from a first casting dye and formed on a support and performing the second casting on the side which had been in contact with the transparent support surface, and this is a method described, for example in JP-B-44-20235. The cellulose acylate solutions cast may be the same solution or different cellulose acylate solutions and are not particularly limited. In order to impart functions to a plurality of cellulose acylate layers, a cellulose acylate solution according to the function may be extruded from each casting port.

Furthermore, in the present invention, the cellulose acylate solution may also be cast simultaneously with other functional layers (for example, adhesive layer, dye layer, antistatic layer, antihalation layer, UV absorbing layer and polarizing layer) to form a functional layer and a film at the same time.

Many of single-layer solutions have a problem that a cellulose acylate solution having a high concentration and a high viscosity must be extruded so as to obtain a required film thickness and in this case, the cellulose acylate solution has bad stability to allow for generation of a solid matter, giving rise to particle failure or poor planarity. For solving this problem, a plurality of cellulose acylate solutions are cast from casting ports. By this casting, high-viscosity solutions can be simultaneously extruded on a support and not only the planarity is improved to enable production of a film having excellent surface state but also reduction in the drying load can be achieved by virtue of use of a thick cellulose acylate solution, which leads to increase in the production speed of film.

For the purpose of improving the mechanical physical properties or increasing the drying speed after casting in the production of a film, a plasticizer may be added to the cellulose acylate film. As for the plasticizer, a phosphoric acid ester or a carboxylic acid ester is used. Examples of the phosphoric acid ester include triphenyl phosphate (TPP), diphenylbiphenyl phosphate and tricresyl phosphate (TCP). The carboxylic acid ester is typically a phthalic acid ester or a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP), dicyclohexyl phthalate (DCyP) and diethylhexyl phthalate (DEHP). Examples of the citric acid ester include triethyl O-acetylcitrate (OACTE), tributyl O-acetylcitrate (OACTB) and tricyclohexyl O-acetylcitrate (OACTCy). Other examples of the carboxylic acid ester include butyl oleate, methylacetyl ricinoleate, dibutyl sebacate and various trimellitic esters. Among these, a phthalic acid ester-based plasticizer and a citric acid ester-based plasticizer are preferred, and DEP, DPP and OACTCy are more preferred.

The amount of the plasticizer added is preferably from 0.1 to 25 mass %, more preferably from 1 to 20 mass %, and most preferably from 3 to 15 mass %, based on the amount of the cellulose acylate.

In the cellulose acylate film, a deterioration inhibitor (e.g., antioxidant, peroxide decomposer, radical inhibitor, metal deactivator, acid scavenger, amine) may be added. The deterioration inhibitor is described in JP-A-3-199201, JP-A-5-197073, JP-A-5-194789, JP-A-5-271471 and JP-A-6-107854. Considering the effect of the deterioration inhibitor and the breed-out (oozing) to the surface, the amount of the deterioration inhibitor added is preferably from 0.01 to 1 mass %, more preferably from 0.01 to 0.2 mass %, based on the solution (dope) prepared. Preferred examples of the deterioration inhibitor include butylated hydroxytoluene (BHT) and tribenzylamine (TBA).

In the cellulose acylate film, for adjusting the retardation of the film, a retardation raising agent may be used, if desired. The retardation of the film is preferably from 0 to 300 nm in the thickness direction and from 0 to 1,000 nm in the in-plane direction.

An aromatic compound having at least two aromatic rings is preferred as the retardation raising agent, and the aromatic compound is used in an amount of 0.01 to 20 parts by mass per 100 parts by mass of the cellulose acylate. The aromatic compound is preferably used in an amount of 0.05 to 15 parts by mass, more preferably from 0.1 to 10 parts by mass, per 100 parts by mass of the cellulose acylate. Two or more kinds of aromatic compounds may be used in combination.

The details thereon are described, for example, in JP-A-2000-111914, JP-A-2000-275434, JP-A-2002-236215 and International Publication No. 00/065384, pamphlet.

<Stretching Treatment of Cellulose Acylate Film>

The produced cellulose acylate film is further subjected to a stretching treatment, whereby drying unevenness and thickness unevenness or surface irregularity generated due to drying shrinkage can be improved. The stretching treatment is also used for adjusting the retardation.

The method for the stretching in the width direction is not particularly limited, but examples thereof include a stretching method by a tenter.

Furthermore, lengthwise stretching is preferably performed in the longitudinal direction of a roll. The draw ratio of respective pass rollers (rotation ratio between a pass roller and a pass roller) among pass rollers for transporting a rolled film is adjusted, whereby the lengthwise stretching becomes possible.

<Polyethylene Terephthalate Film>

In the present invention, a polyethylene terephthalate film may also be preferably used, because this film is excellent in all of transparency, mechanical strength, planarity, chemical resistance and moisture resistance and is inexpensive.

The transparent plastic film is more preferably subjected to an easy adhesion treatment so as to further increase the adhesion strength between the transparent plastic film and the hardcoat layer provided thereon.

Examples of the commercially available optical PET film with an easy adhesion layer include COSMOSHINE A4100 and A4300 produced by Toyobo Co., Ltd.

As regards the transparent support for use in the present invention, a transparent support comprising a polymer resin having an alicyclic structure may also be preferably used. The polymer containing an alicyclic structure has an alicyclic structure in a repeating unit of the polymer, and both a polymer containing an alicyclic structure in the main chain and a polymer containing an alicyclic structure in the side chain can be used.

Examples of the alicyclic structure include a cycloalkane structure and a cycloalkene structure. In view of thermal stability and the like, a cycloalkane structure is preferred. The number of carbon atoms constituting the alicyclic structure is not particularly limited but is usually from 4 to 30, preferably from 5 to 20, more preferably from 5 to 15. When the number of carbon atoms constituting the alicyclic structure is in this range, a transparent plastic film excellent in the heat resistance and flexibility can be obtained.

The proportion of the alicyclic structure-containing repeating unit in the polymer containing an alicyclic structure may be appropriately selected according to the intended use but is usually 50 wt % or more, preferably 70 wt % or more, more preferably 90 wt % or more. If the proportion of the alicyclic structure-containing repeating unit is excessively small, heat resistance decreases and this is not preferred. The repeating unit other than the alicyclic structure-containing repeating unit in the polymer containing an alicyclic structure is appropriately selected according to the intended use.

Specific examples of the polymer containing an alicyclic structure include (i) a norbornene-based polymer, (ii) a monocyclic cycloolefin-based polymer, (iii) a cyclic conjugated diene-based polymer, (iv) a vinyl alicyclic hydrocarbon polymer, and a hydrogenation product of these polymers. Among these, a norbornene-based polymer is preferred in view of transparency and shapability.

Specific examples of the norbornene-based polymer include a ring-opened polymer of norbornene-based monomer, a ring-opened copolymer of norbornene-based monomer and another monomer ring-opening polymerizable therewith, a hydrogenation product of these polymers, an addition polymer of norbornene-based monomer, and an addition polymer of norbornene-based monomer and another monomer copolymerizable therewith. Among these, a hydrogenation product of a ring-opened (co)polymer of norbornene-based monomer is preferred in view of transparency.

Examples of the norbornene-based monomer include bicyclo[2.2.1]hept-2-ene (trivial name: norbornene), tricyclo[4.3.0.1$^{2,5}$]deca-3,7-diene (trivial name: dicyclopentadiene), 7,8-benzotricyclo[4.3.0.1$^{2,5}$]deca-3-ene (trivial name: methanotetrahydrofluorene), tetracyclo[4.4.0.1$^{2,5}$.1$^{7,10}$]dodeca-3-ene (trivial name: tetracyclododecene), and a derivative of these compounds, such as a derivative obtained by introducing a substituent into the ring. Examples of the substituent include an alkyl group, an alkenyl group, an alkoxycarbonyl group and a carboxyl group. A plurality of these substituents, which may be the same or different, may be bonded to the ring. One of these norbornene-based monomers may be used alone, or two or more kinds thereof may be used in combination.

Examples of the another monomer ring-opening polymerizable with the norbornene-based monomer include monocyclic olefins such as cyclohexene, cycloheptene and cyclooctene, and a derivative thereof; and a cyclic conjugated diene such as cyclohexadiene and cycloheptadiene, and a derivative thereof.

The ring-opened polymer of norbornene-based monomer and the ring-opened copolymer of norbornene-based monomer and another monomer copolymerizable therewith can be obtained by polymerizing the monomer(s) in the presence of a ring-opening polymerization catalyst.

As for the ring-opening polymerization catalyst, those heretofore known can be used.

Examples of the another monomer addition-copolymerizable with the norbornene-based monomer include an α-olefin having a carbon number of 2 to 20, such as ethylene and propylene, and a derivative thereof; a cycloolefin such as cyclobutene and cyclopentene, and a derivative thereof; and a non-conjugated diene such as 1,4-hexadiene. One of these monomers may be used alone, or two or more kinds thereof may be used in combination. Among these, an α-olefin is preferred, and ethylene is more preferred.

The addition polymer of norbornene-based monomer and the addition copolymer of norbornene-based monomer and another monomer copolymerizable therewith can be obtained by polymerizing the monomer(s) in the presence of an addition polymerization catalyst. As for the addition polymerization catalyst, those heretofore known can be used.

The hydrogenation product of a ring-opened polymer of norbornene-based monomer or a ring-opened copolymer of norbornene-based monomer and another monomer ring-opening polymerizable therewith can be obtained by hydrogenating the carbon-carbon unsaturated bond preferably to a degree of 90% or more with use of a known hydrogenation catalyst.

As regards the norbornene-based resin, for example, "ZEONOR" and "ZEONEX", trade names, produced by ZEON Corp.; "ARTON", trade name, produced by JSR Corp.; "OPTOREZ", trade name, produced by Hitachi Chemical Co., Ltd.; and "APEL", trade name, produced by Mitsui Chemicals, Inc., are commercially available.

Examples of the monocyclic cycloolefin-based polymer include an addition polymer of cyclohexene, cycloheptene or cyclooctene.

Examples of the cyclic conjugated diene-based polymer include a polymer obtained by the 1,2-addition polymerization or 1,4-addition polymerization of a cyclic conjugated diene-based monomer such as cyclopentadiene or cyclohexadiene.

The vinyl alicyclic hydrocarbon polymer is a polymer having a repeating unit derived from vinylcycloalkane or vinylcycloalkene. Examples of the vinyl alicyclic hydrocarbon polymer include a polymer of a vinyl alicyclic hydrocarbon compound such as vinylcyclohexene, and a hydrogenation product thereof; and a polymer obtained by hydrogenating the aromatic ring moiety of a polymer of a vinyl aromatic hydrocarbon compound such as styrene and $\alpha$-methylstyrene.

Also, the vinyl alicyclic hydrocarbon polymer may be a copolymer such as random or block copolymer of a vinyl alicyclic or aromatic hydrocarbon compound and another monomer copolymerizable with the vinyl alicyclic or aromatic hydrocarbon compound monomer, or a hydrogenation product thereof.

As for the molecular weight of the polymer having an alicyclic structure, the weight average molecular weight in terms of polyisoprene or polystyrene as measured by gel permeation chromatography using cyclohexane as the solvent (using toluene when the polymer resin does not dissolve) is usually from 10,000 to 300,000, preferably from 20,000 to 200,000. When the molecular weight is in this range, the transparent plastic film is highly balanced between mechanical strength and shaping processability and is suitable.

The glass transition temperature of the polymer having an alicyclic structure may be appropriately selected according to the intended use but is preferably 80° C. or more, more preferably from 100 to 250° C. When the glass transition temperature is in this range, the transparent plastic film exhibits excellent durability without causing deformation or stress on use at a high temperature.

The transparent support comprising a polymer having an alicyclic structure can be obtained by shaping the above-described polymer into a film form by a known shaping method.

The method for the shaping the polymer into a film form includes a solution casting method and a melt-extrusion shaping method. Of these, a melt-extrusion shaping method is preferred in that the volatile component content in the film or the film thickness can be made less uneven, as well as in view of productivity. The melt-extrusion shaping method includes a method using a die such as T-die and an inflation method, and a method using a T-die is preferred because of excellent thickness precision.

In the case of employing a method using a T-die as the method for shaping a film, the melt temperature in the extruder having a T-die is preferably set to a temperature higher than the glass transition point of the polymer used by 80 to 180° C., more preferably by 100 to 150° C. If the melt temperature in the extruder is excessively low, the fluidity of the polymer may decrease, whereas if the melt temperature is too high, the polymer may deteriorate.

Before the shaping into a film form, the polymer used is preferably subjected to preliminary drying. The preliminary drying is performed, for example, by forming the raw materials into a pellet and drying it by a hot-air drier. The drying temperature is preferably 100° C. or more, and the drying time is preferably 2 hours or more. By virtue of performing the preliminary drying, the amount of volatile components in the film can be reduced. Furthermore, the polymer extruded can be prevented from foaming.

The polymer used preferably has a saturated water absorbency of less than 0.05%. When a polymer having a saturated water absorbency of less than 0.05% is used, at the time of forming a stack on the filmy, moisture is not emitted to deteriorate the quality or decrease the productivity. Also, the film can be prevented from shrinking due to moisture absorption and, resultantly, a layer stacked is not separated from the transparent plastic film. Particularly, when the antireflection film is used in a large-screen liquid crystal display device, the image quality can be prevented from worsening which is caused by the dimensional change due to moisture absorption.

[High Refractive Index Layer and Medium Refractive Index Layer]

The refractive index of the high refractive index layer which is an indispensable thin-film layer of the present invention is, as described above, from 1.70 to 1.74 and is preferably from 1.71 to 1.73. The refractive index of the medium refractive index layer which is an indispensable thin-film layer of the present invention is adjusted to a value between the refractive index of the low refractive index layer and the refractive index of the high refractive index layer. The refractive index of the medium refractive index layer is preferably from 1.60 to 1.64, more preferably from 1.61 to 1.63.

As for the method of forming the high refractive index layer and the medium refractive index layer, a transparent thin film of inorganic oxide formed by chemical vapor deposition (CVD) or physical vapor deposition (PVD), particularly, vacuum deposition or sputtering, which is a kind of physical vapor deposition method, may be used, but a thin film formed by all-wet coating is preferred.

The medium refractive index layer can be prepared in the same manner by using the same materials as the high refractive index layer except that the refractive index is different, and therefore, the high refractive index layer is particularly described below.

The medium refractive index layer and the high refractive index layer each is preferably formed by applying a coating composition containing an inorganic fine particle comprising an oxide of at least one metal selected from Ti, Zr, In, Zn, Sn, Al and Sb, a curable resin (hereinafter sometimes referred to as a "binder") containing a trifunctional or greater polymerizable group, a solvent and a polymerization initiator, drying the solvent, and curing the coating by either one or both means of heating and irradiation of ionizing radiation. In the case of using a curable resin or an initiator, the curable resin is cured through a polymerization reaction by the effect of heat and/or ionizing radiation after coating, whereby a medium or high refractive index layer excellent in the scratch resistance and adhesion can be formed.

(Inorganic Fine Particle)

The inorganic fine particle is preferably an oxide of a metal (e.g., Ti, Zr, In, Zn, Sn, Sb, Al) and in view of refractive index, a fine particle of zirconium oxide is most preferred. However, in view of electrical conductivity, it is preferred to use an inorganic fine particle in which the main component is an oxide of at least one metal out of Sb, In and Sn. The refractive index can be adjusted to a predetermined range by changing the amount of the inorganic fine particle. The average particle diameter of the inorganic fine particle in the layer is, when zirconium oxide is used as the main component, preferably from 1 to 120 nm, more preferably from 1 to 60 nm n still more preferably from 2 to 40 nm. This range is preferred because the haze is decreased and the dispersion stability and adhesion to the upper layer by virtue of appropriate irregularities on the surface are enhanced.

The refractive index of the inorganic fine particle comprising zirconium oxide as the main component, for use in the present invention, is preferably from 1.90 to 2.80, more preferably from 2.10 to 2.80, and most preferably from 2.20 to 2.80.

The amount of the inorganic fine particle added varies depending on the layer to which the inorganic fine particle is added, and in the medium refractive index layer, the amount added is from 20 to 60 mass %, preferably from 25 to 55 mass %, still more preferably from 30 to 50 mass % based on the solid content of the entire medium refractive index layer. In the high refractive index layer, the amount added is from 40 to 90 mass %, preferably from 50 to 85 mass %, more preferably from 60 to 80 mass %, based on the solid content of the entire high refractive index layer.

The particle diameter of the inorganic fine particle can be measured by a light-scattering method or an electron micrograph.

The specific surface area of the inorganic fine particle is preferably from 10 to 400 $m^2/g$, more preferably from 20 to 200 $m^2/g$, and most preferably from 30 to 150 $m^2/g$.

For the purpose of stabilizing the dispersion in the liquid dispersion or coating solution or enhancing the affinity or binding with the binder component, the inorganic fine particle may be subjected to a physical surface treatment such as plasma discharge treatment and corona discharge treatment, or a chemical surface treatment with a surfactant, a coupling agent or the like. Use of a coupling agent is particularly preferred. As for the coupling agent, an alkoxy metal compound (e.g., titanium coupling agent, silane coupling agent) is preferably used. Above all, a treatment with a silane coupling agent having an acryloyl or methacryloyl group is effective. The chemical surface treating agent of inorganic fine particle, the solvent, the catalyst and the stabilizer of dispersion are described in JP-A-2006-17870, paragraphs [0058] to [0083].

(Curable Resin)

The curable resin is preferably a polymerizable compound and as for the polymerizable compound, an ionizing radiation-curable polyfunctional monomer or polyfunctional oligomer is preferably used. The functional group in this compound is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

Specific examples the photopolymerizable polyfunctional monomer having a photopolymerizable functional group include:

(meth)acrylic acid diesters of alkylene glycol, such as neopentyl glycol acrylate, 1,6-hexanediol(meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis{4-(acryloxy.diethoxy)phenyl}propane and 2-2-bis{4-(acryloxy.polypropoxy)phenyl}propane.

Furthermore, epoxy(meth)acrylates, urethane(meth)acrylates and polyester(meth)acrylates may also be preferably used as the photopolymerizable polyfunctional monomer.

Among these, esters of a polyhydric alcohol and a (meth)acrylic acid are preferred, and a polyfunctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, dipentaerythritol triacrylate, dipentaerythritol pentaacrylate, dipentaerythritol tetra(meth)acrylate, dipentaerythritol hexa(meth)acrylate, tripentaerythritol triacrylate and tripentaerythritol hexatriacrylate. Two or more kinds of polyfunctional monomers may be used in combination.

The amount of the curable resin used may be adjusted within the range satisfying the above-described refractive index of each layer.

(Polymerization Initiator)

As for the polymerization initiator, a photopolymerization initiator is preferably used. The photopolymerization initiator is preferably a photoradical polymerization initiator or a photocationic polymerization initiator, more preferably a photoradical polymerization initiator.

Examples of the photoradical polymerization initiator include acetophenones, benzophenones, Michler's benzoyl benzoate, α-amyloxime ester, tetramethylthiuram monosulfide and thioxanthones.

Examples of the commercially available photoradical polymerization initiator include KAYACURE (e.g., DETX-S, BP-100, BDMK, CTX, BMS, 2-EAQ, ABQ, CPTX, EPD, ITX, QTX, BTC, MCA) produced by Nippon Kayaku Co., Ltd.; Irgacure (e.g., 651, 184, 127, 500, 907, 369, 1173, 2959, 4265, 4263) produced by Ciba Specialty Chemicals Corp.; and Esacure (KIP100F, KB1, EB3, BP, X33, KT046, KT37, KIP150, TZT) produced by Sartomer Company Inc.

Above all, a photocleavage-type photoradical polymerization initiator is preferred. The photocleavage-type photoradical polymerization initiator is described in *Saishin UV Koka Gijutsu* (*Newest UV Curing Technologies*), page 159, Technical Information Institute Co., Ltd. (publisher: Kazuhiro Takausu) (1991).

Examples of the commercially available photocleavage-type photoradical polymerization initiator include Irgacure (e.g., 651, 184, 127, 907) produced by Ciba Specialty Chemicals Corp.

The photopolymerization initiator is preferably used in an amount of 0.1 to 15 parts by mass, more preferably from 1 to 10 parts by mass, per 100 parts by mass of the curable resin.

In addition to the photopolymerization initiator, a photosensitizer may be used. Specific examples of the photosensitizer include n-butylamine, triethylamine, tri-n-butylphosphine, Michler's ketone and thioxanthone.

Examples of the commercially available photosensitizer include KAYACURE (e.g., DMBI, EPA) produced by Nippon Kayaku Co., Ltd.

The photopolymerization reaction is preferably performed by the ultraviolet irradiation after coating and drying the high refractive index layer.

In the high refractive index layer, a surfactant, an antioxidant, a coupling agent, a thickener, a coloration inhibitor, a coloring agent (e.g., pigment, dye), a defoaming agent, a leveling agent, a flame retardant, an ultraviolet absorbent, an infrared absorbent, an adhesion-imparting agent, a polymerization inhibitor, an antioxidant, a surface modifier, an electrically conductive metal fine particle and the like may be added in addition to the above-described components (e.g., inorganic fine particle, curable resin, polymerization initiator, photosensitizer).

(Solvent)

As for the solvent, a liquid having a boiling point of 60 to 170° C. is preferably used. Specific examples thereof include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran), and an ether alcohol (e.g., 1-methoxy-2-propanol). Among these, toluene, xylene, methyl ethyl ketone, methyl isobutyl ketone, cyclohexanone and butanol are preferred. In particular, the dispersion medium is preferably methyl ethyl ketone, methyl isobutyl ketone or cyclohexanone.

The solvent is preferably used to give a coating composition for high refractive index layer having a solid content concentration of 2 to 30 mass %, more preferably from 3 to 20 mass %. With respect to the medium refractive index layer, the solvent is preferably used to give a coating composition having a solid content concentration of 1 to 20 mass %, more preferably from 2 to 15 mass %.

(High (Medium) Refractive Index Layer Forming Method)

The inorganic fine particle comprising zirconium oxide as the main component, which is used for the high refractive index layer and the medium refractive index layer, is preferably used in a dispersion state for the formation of the high refractive index layer and the medium refractive index layer.

The inorganic fine particle can be dispersed using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. A preliminary dispersion treatment may be performed. Examples of the disperser for use in the preliminary dispersion treatment include a ball mill, a three-roll mill, a kneader and an extruder.

The inorganic fine particle is preferably dispersed in the dispersion medium to have a particle size as small as possible. The mass average particle diameter is from 10 to 120 nm, preferably from 20 to 100 nm, more preferably from 30 to 90 nm, still more preferably from 30 to 80 nm.

By dispersing the inorganic fine particle to a small particle size of 200 nm or less, the high refractive index layer and medium refractive index layer can be formed without impairing transparency.

The high refractive index layer and the medium refractive index layer for use in the present invention each is preferably formed as follows. A curable resin (for example, the above-described ionizing radiation-curable polyfunctional monomer or polyfunctional oligomer) as a binder precursor necessary for the matrix formation, a photopolymerization initiator and the like are added to a liquid dispersion obtained by dispersing the inorganic fine particle in a dispersion medium as described above, to prepare a coating composition for the formation of the high or medium refractive index layer, and the obtained coating composition for the formation of the high or medium refractive index layer is coated on the transparent support and cured through a crosslinking or polymerization reaction of the curable resin.

Simultaneously with or after the coating of the high or medium refractive index layer, the binder of the layer is preferably crosslinked or polymerized with the dispersant.

The binder in the thus-produced high or medium refractive index layer takes a form, for example, such that the anionic group of the dispersant is taken into the binder as a result of crosslinking or polymerization reaction between the above-described preferred dispersant and the ionizing radiation-curable polyfunctional monomer or polyfunctional oligomer. The anionic group taken into the binder of the high or medium refractive index layer has a function of maintaining the dispersed state of the inorganic fine particle, and the crosslinked or polymerized structure imparts a film-forming ability to the binder, whereby the high or medium refractive index layer containing the inorganic fine particle is improved in the physical strength, chemical resistance and weather resistance.

In the formation of the high refractive index layer, the crosslinking or polymerization reaction of the curable resin is preferably performed in an atmosphere having an oxygen concentration of 10 vol % or less.

By forming the high refractive index layer in an atmosphere having an oxygen concentration of 10 vol % or less, the high refractive index layer can be improved in the physical strength, chemical resistance, weather resistance and adhesion between the high refractive index layer and a layer adjacent to the high refractive index layer.

The layer formation through a crosslinking or polymerization reaction of the curable resin is preferably performed in an atmosphere having an oxygen concentration of 6 vol % or less, more preferably 4 vol % or less, still more preferably 2 vol % or less, and most preferably 1 vol % or less.

The thickness of the high refractive index layer is preferably from 105 to 115 nm, more preferably from 107.5 to 112.5 nm, and the thickness of the medium refractive index layer is preferably from 55 to 65 nm, more preferably from 58.5 to 61.5 nm.

As described above, the medium refractive index layer can be obtained using the same materials in the same manner as the high refractive index layer.

Specifically, for example, a main composition is formulated by selecting the kind of the fine particle and the kind of the resin and determining the blending ratio therebetween so that the medium refractive index layer and the high refractive index layer can satisfy the film thickness and refractive index of formulae (I) and (II).

[Low Refractive Index Layer]

The refractive index of the low refractive index layer suitably used in the present invention is preferably from 1.32 to 1.37, more preferably from 1.35 to 1.37. This range is preferred because the film strength can be maintained while reducing the reflectance. As for the method of forming the low refractive index layer, similarly to the above, a transparent thin film of inorganic oxide formed by chemical vapor deposition (CVD) or physical vapor deposition (PVD), particularly, vacuum deposition or sputtering, which is a kind of physical vapor deposition method, may be used, but a method by all-wet coating using a coating composition described later for the formation of the low refractive index layer is preferred. The low refractive index layer preferably contains an inorganic fine particle and out of the inorganic fine particles, at least one inorganic fine particle is preferably a hollow particle, more preferably a hollow particle comprising silica as the main component (hereinafter referred to as a "hollow silica particle").

The thickness of the low refractive index layer is preferably from 85.0 to 95.0 nm, more preferably from 88.0 to 92.0 nm.

The haze of the low refractive index layer is preferably 3% or less, more preferably 2% or less, and most preferably 1% or less.

The strength of the antireflection film where layers up to the low refractive index layer are formed, is preferably H or more, more preferably 2H or more, and most preferably 3H or more, in the pencil hardness test with a load of 500 g.

Also, in order to improve the antifouling performance of the antireflection film, the contact angle for water on the surface is preferably 90° or more, more preferably 95° or more, still more preferably 100° or more.

(Inorganic Fine Particle)

The inorganic fine particle which can be used in the low refractive index layer is preferably a hollow particle.

The refractive index of the hollow particle is preferably from 1.17 to 1.40, more preferably from 1.17 to 1.35, and most preferably from 1.17 to 1.33. The hollow particle is preferably a hollow silica particle, and the inorganic fine particle is described below by referring to the hollow silica particle. The refractive index used here indicates the refractive index of the particle as a whole and does not indicate the refractive index of only the silica as the outer shell forming the hollow silica particle. At this time, assuming that the radius of the cavity inside the particle is a and the radius of the outer shell of the particle is b, the porosity x represented by the following formula (7) is preferably from 10 to 60%, more preferably from 20 to 60%, and most preferably from 30 to 60%.

$$x=(4\pi a^3/3)/(4\pi b^3/3)\times 100 \quad \text{Formula (7)}$$

If the hollow silica particle is intended to have a lower refractive index and a higher porosity, the thickness of the outer shell becomes small and the strength as a particle decreases. Therefore, in view of scratch resistance, a particle having a refractive index within the above-described range is preferred.

Here, the refractive index of the hollow silica particle can be measured by an Abbe refractometer (manufactured by ATAGO K.K.).

The production method of the hollow silica is described, for example, in JP-A-2001-233611 and JP-A-2002-79616.

A commercially available hollow silica particle may also be used.

The coated amount of the hollow silica particle is preferably from 1 to 100 mg/m$^2$, more preferably from 5 to 80 mg/m$^2$, still more preferably from 10 to 60 mg/m$^2$. Within this range, good effect of decreasing the refractive index or improving the scratch resistance is obtained, generation of fine irregularities on the low refractive index layer surface can be prevented, and the appearance (e.g., dense black appearance) and integrated reflectance can be successfully maintained.

The average particle diameter of the hollow silica particle is preferably from 30 to 150%, more preferably from 35 to 80%, still more preferably from 40 to 60%, of the thickness of the low refractive index layer. In other words, when the thickness of the low refractive index layer is 100 nm, the particle diameter of the hollow silica particle is preferably from 30 to 150 nm, more preferably from 35 to 80 nm, still more preferably from 40 to 60 nm.

When the particle diameter is in this range, the proportion of the cavity can be satisfactorily kept, the refractive index can be sufficiently reduced, generation of fine irregularities on the low refractive index layer surface can be prevented, and the appearance (e.g., dense black appearance) and integrated reflectance can be successfully maintained. The silica fine particle may be crystalline or amorphous and is preferably a monodisperse particle. The shape is most preferably spherical but even if infinite form, there arises no problem.

The average particle diameter of the hollow silica particle can be determined from the electron micrograph.

In the present invention, a cavity-free silica particle may be used in combination with the hollow silica particle. The particle size of the cavity-free silica is preferably from 5 to 150 nm, more preferably from 10 to 80 nm, and most preferably from 15 to 60 nm.

Also, at least one kind of a silica fine particle with the average particle diameter being less than 25% of the thickness of the low refractive index layer (referred to as a "small particle-size silica fine particle") is preferably used in combination with the silica fine particle having the above-described particle diameter (referred to as a "large particle-size silica fine particle").

The small particle-size silica fine particle can be present in a void between large particle-size silica fine particles and therefore, can contribute as a holding agent for the large particle-size silica fine particle.

The average particle diameter of the small particle-size silica fine particle is preferably from 1 to 20 nm, more preferably from 5 to 15 nm, still more preferably from 10 to 15 nm. Use of such a silica fine particle is preferred in view of the raw material cost and the holding agent effect.

For the purpose of stabilizing the dispersion in a liquid dispersion or coating solution or enhancing the affinity or binding with the binder component, the hollow particle may be subjected to a physical surface treatment such as plasma discharge treatment and corona discharge treatment, or a chemical surface treatment with a surfactant, a coupling agent or the like. Use of a coupling agent is particularly preferred. As for the coupling agent, an alkoxy metal compound (e.g., titanium coupling agent, silane coupling agent) is preferably used. Above all, a treatment with a silane coupling agent having an acryloyl or methacryloyl group is effective. The chemical surface treating agent of hollow particle, the solvent, the catalyst and the stabilizer of dispersion are described in JP-A-2006-17870, paragraphs [0058] to [0083].

The low refractive index layer is preferably formed by applying a coating composition containing a film-forming solute and one or more kind of solvents, drying the solvent and curing the coating by either one or both means of heating and irradiation of ionizing radiation.

The solute is preferably a composition containing a heat-curable or ionizing radiation-curable fluorine-containing curable resin, a hydrolysate of an organosilyl compound, or a partial condensate thereof.

A composition containing a fluorine-containing curable resin is preferably used, and an embodiment using secondarily a hydrolysate of an organosilyl compound or a partial condensate thereof is more preferred. The amount added of the hydrolysate of an organosilyl compound or a partial condensate thereof, which is used secondarily, is from 10 to 40 mass % based on the fluorine-containing curable resin.
(Fluorine-Containing Curable Resin)

The fluorine-containing curable resin (hereinafter sometimes referred to as a "fluorine-containing polymer") includes a hydrolysate of a perfluoroalkyl group-containing silane compound (e.g., (heptadecafluoro-1,1,2,2-tetrahydrodecyl) triethoxysilane), a dehydrating condensate thereof, and a fluorine-containing copolymer in which a fluorine-containing monomer unit and a constituent unit for imparting crosslinking reactivity are contained as the constituent components. In particular, the low refractive index layer for use in the present invention is preferably formed by a cured film of a copolymer comprising as essential constituent components a repeating unit derived from a fluorine-containing vinyl monomer and a repeating unit having a (meth)acryloyl group in the side chain. From the standpoint of satisfying both the reduction of refractive index and the film strength, it is also preferred to use a curing agent such as polyfunctional (meth) acrylate in combination. The mixing ratio of the fluorine-containing polymer and the polyfunctional (meth)acrylate is not particularly limited, but a mixing ratio causing no phase separation therebetween in the film after drying is preferred. Of course, only either one may be used. Specific examples of the polyfunctional (meth)acrylate include the photopolymerizable polyfunctional monomers described for the high refractive index layer.

The preferred fluorine-containing curable resin for use in the low refractive index layer of the present invention is described below.

Examples of the fluorine-containing vinyl monomer include fluoroolefins (e.g., fluoroethylene, vinylidene fluoride, tetrafluoroethylene, hexafluoropropylene), partially or completely fluorinated alkyl ester derivatives of (meth) acrylic acid (e.g., VISCOAT 6FM (trade name, produced by Osaka Organic Chemical Industry Ltd.), M-2020 (trade name, produced by Daikin Industries, Ltd.)), and completely or partially fluorinated vinyl ethers. Among these, perfluoroolefins are preferred and in view of refractive index, solubility, transparency, availability and the like, hexafluoropropylene is more preferred. In the present invention, the fluorine-containing vinyl monomer is preferably introduced to give a copolymer having a fluorine content of 20 to 60 mass %, more preferably from 25 to 55 mass %, still more preferably from 30 to 50 mass %. When the compositional ratio of the fluorine-containing vinyl monomer is in this range, not only the refractive index can be satisfactorily reduced but also the film strength can be maintained.

The fluorine-containing curable resin for use in the low refractive index layer preferably has a crosslinking reactive group. Examples of the constituent unit for imparting crosslinking reactivity include a constituent unit obtained by the polymerization of a monomer previously having a self-crosslinking functional group within the molecule, such as glycidyl(meth)acrylate and glycidyl vinyl ether; a constituent unit obtained by the polymerization of a monomer having a carboxy group, a hydroxy group, an amino group, a sulfo group or the like (such as (meth)acrylic acid, methylol(meth) acrylate, hydroxyalkyl(meth)acrylate, allyl acrylate, hydroxyethyl vinyl ether, hydroxybutyl vinyl ether, maleic acid and crotonic acid); and a constituent unit obtained by introducing a crosslinking reactive group such as (meth)acryloyl group into the above-described constituent units by a polymer reaction (for example, the crosslinking reactive group can be introduced by causing an acrylic acid chloride to act on a hydroxy group). The copolymer as the fluorine-containing polymer for use in the low refractive index layer preferably contains a repeating unit having a (meth)acryloyl group in the side chain, as an essential constituent component. In general, the (meth)acryloyl group-containing repeating unit preferably occupies from 5 to 90 mass %, more preferably from 30 to 70 mass %, still more preferably from 40 to 60 mass %, though this may vary depending on the kind of the repeating unit derived from the fluorine-containing vinyl monomer. When the compositional ratio of the (meth) acryloyl group-containing repeating unit is increased, the film strength is enhanced but the refractive index increases, and this is preferred.

In the copolymer useful for the present invention, in addition to the repeating unit derived from the fluorine-containing vinyl monomer and the repeating unit having a (meth)acryloyl group in the side chain, other vinyl monomers may be appropriately copolymerized from various viewpoints such as adhesion to transparent support, Tg (contributing to film hardness) of polymer, solubility in solvent, transparency, slipperiness, dust protection and antifouling property. A plurality of these vinyl monomers may be combined according to the purpose, and these monomers are preferably introduced to account for, in total, from 0 to 65 mol %, more preferably from 0 to 40 mol %, still more preferably from 0 to 30 mol %, in the copolymer.

The vinyl monomer which can be used in combination is not particularly limited, and examples thereof include olefins (e.g., ethylene, propylene, isoprene, vinyl chloride, vinylidene chloride), acrylic acid esters (e.g., methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide), and acrylonitrile.

With such a polymer, a hardening agent may be appropriately used in combination as described in JP-A-10-25388 and JP-A-10-147739.

A preferred embodiment of the fluorine-containing curable resin for use in the present invention includes a resin represented by the formula III:

Formula III:

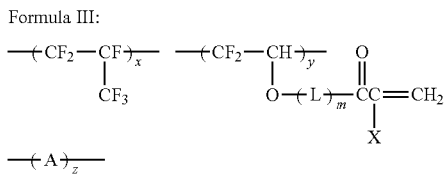

In formula III, L represents a linking group having a carbon number of 1 to 10 and is preferably a linking group having a carbon number of 1 to 6, more preferably from 2 to 4, and the linking group may have a linear or branched structure or a cyclic structure and may contain a heteroatom selected from O, N and S.

Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—**, *—CONH—$(CH_2)_3$—O—**, *—$CH_2CH(OH)CH_2$—O—** and *—$CH_2CH_2OCONH$—$(CH_2)_3$—O—** (wherein * denotes the linking site on the polymer main chain side and ** denotes the linking site on the (meth)acryloyl group side). m represents 0 or 1.

In formula III, A represents a hydrogen atom or a methyl group and in view of the curing reactivity, is preferably a hydrogen atom.

In formula III, A represents a repeating unit derived from an arbitrary vinyl monomer. The repeating unit is not particularly limited as long as it is a constituent component of a monomer copolymerizable with hexafluoropropylene, and may be appropriately selected from various viewpoints such as adhesion to transparent support, Tg (contributing to film hardness) of polymer, solubility in solvent, transparency, slipperiness, dust protection and antifouling property. The repeating unit may be composed a single vinyl monomer or a plurality of vinyl monomers according to the purpose.

Preferred examples of the vinyl monomer include vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl(meth)acrylate, ethyl(meth)acrylate, hydroxyethyl(meth)acrylate, glycidyl methacrylate, allyl(meth)acrylate and (meth)acryloyloxypropyltrimethoxysilane; styrene derivatives such as styrene and p-hydroxymethylstyrene; and unsaturated carboxylic acids and derivatives thereof such as crotonic acid, maleic acid and itaconic acid. Among these, vinyl ether derivatives and vinyl ester derivatives are preferred, and vinyl ether derivatives are more preferred.

x, y and z represent mol % of respective constituent components and represent values satisfying $30 \leq x \leq 60$, $5 \leq y \leq 70$ and $0 \leq z \leq 65$, provided that $x+y+z=100$. These more preferably satisfy $35 \leq x \leq 55$, $30 \leq y \leq 60$ and $0 \leq z \leq 20$, still more preferably $40 \leq x \leq 55$, $40 \leq y \leq 55$ and $0 \leq z \leq 10$.

A particularly preferred embodiment of the copolymer for use in the present invention includes a compound represented by formula IV:

Formula IV:

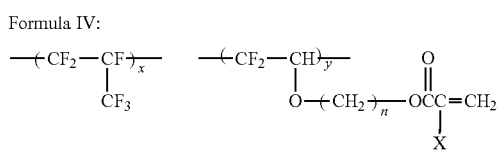

-continued

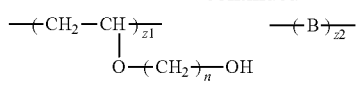

In formula IV, X, x and y have the same meanings as in formula III and the preferred ranges are also the same.

n represents an integer of $2 \leq n \leq 10$ and is preferably $2 \leq n \leq 6$, more preferably $2 \leq n \leq 4$.

B represents a repeating unit derived from an arbitrary vinyl monomer and may be composed of a single composition or a plurality of compositions. Examples thereof include those described above as examples of A in formula III.

z1 and z2 represent mol % of respective repeating units and represent values satisfying $0 \leq z1 \leq 65$ and $0 \leq z2 \leq 65$, provided that $x+y+z1+z2=100$. These more preferably satisfy $0 \leq z1 \leq 30$ and $0 \leq z2 \leq 10$, still more preferably $0 < z1 \leq 10$ and $0 \leq z2 \leq 5$.

The copolymer represented by formula III or IV can be synthesized, for example, by introducing a (meth)acryloyl group into a copolymer comprising a hexafluoropropylene component and a hydroxyalkyl vinyl ether component by any means described above.

Preferred examples of the copolymer useful in the present invention are set forth below, but the present invention is not limited thereto.

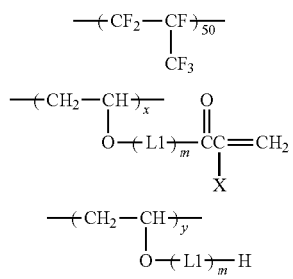

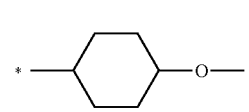

| | x | y | m | L1 | X | Number Average Molecular Weight Mn (×10⁴) |
|---|---|---|---|---|---|---|
| P-1 | 50 | 0 | 1 | *—$CH_2CH_2O$— | H | 3.1 |
| P-2 | 50 | 0 | 1 | *—$CH_2CH_2O$— | $CH_3$ | 4.0 |
| P-3 | 45 | 5 | 1 | *—$CH_2CH_2O$— | H | 2.8 |
| P-4 | 40 | 10 | 1 | *—$CH_2CH_2O$— | H | 3.8 |
| P-5 | 30 | 20 | 1 | *—$CH_2OH_2O$— | H | 5.0 |
| P-6 | 20 | 30 | 1 | *—$CH_2CH_2O$— | H | 4.0 |
| P-7 | 50 | 0 | 0 | — | H | 11.0 |
| P-8 | 50 | 0 | 1 | *—$C_4H_8O$— | H | 0.8 |
| P-9 | 50 | 0 | 1 | *—$(CH_2)_2O(CH_2)_2O$— | H | 1.0 |
| P-10 | 50 | 0 | 1 | *—⟨cyclohexyl⟩—O— | H | 7.0 |

*denotes the polymer main chain side.

$$-(CF_2-CF)_{50}-$$
$$\phantom{xxxxx}|$$
$$\phantom{xxxx}CF_3$$

$$-(CH_2-CH)_x-\phantom{xx}O$$
$$\phantom{xxxxxx}|\phantom{xxxxxx}\|$$
$$\phantom{xxxxx}O-(L1)_m-C-C=CH_2$$
$$\phantom{xxxxxxxxxxxxxxx}|$$
$$\phantom{xxxxxxxxxxxxxxx}X$$

$$-(CH_2-CH)_y-$$
$$\phantom{xxxxxx}|$$
$$\phantom{xxxxx}O-(L1)_m-H$$

| | x | y | m | L1 | X | Number Average Molecular Weight Mn (×10⁴) |
|---|---|---|---|---|---|---|
| P-11 | 50 | 0 | 1 | *—CH₂CH₂NH— | H | 4.0 |
| P-12 | 50 | 0 | 1 | *—CH₂CH₂OC(O)NHCH₂CH₂O— | H | 4.5 |
| P-13 | 50 | 0 | 1 | *—CH₂CH₂OC(O)NHCH₂CH₂O— | CH₃ | 4.5 |
| P-14 | 50 | 0 | 1 | *—CH₂CH₂CH₂CH₂OC(O)NHCH₂CH₂O— | CH₃ | 5.0 |
| P-15 | 50 | 0 | 1 | *—CH₂CH(OH)CH₂O— | H | 3.5 |
| P-16 | 50 | 0 | 1 | *—CH₂CH(CH₂OH)O— | H | 3.0 |
| P-17 | 50 | 0 | 1 | *—CH₂CH₂OCH₂—CH(OH)CH₂O— | H | 3.0 |
| P-18 | 50 | 0 | 1 | *—CH₂OCH₂CH(OH)—CH₂O— | CH₃ | 3.0 |
| P-19 | 50 | 0 | 1 | *—CH₂OCH₂CH(CH₂OH)—O— | CH₃ | 3.0 |
| P-20 | 40 | 10 | 1 | *—CH₂CH₂O— | CH₃ | 0.6 |

*denotes the polymer main chain side.

$$-(CF_2-CF)_a-\phantom{xx}-(CF_2-CF)_b-\phantom{xx}-(A)_c-$$
$$\phantom{xxxxx}|\phantom{xxxxxxxxxxxx}|\phantom{xx}O$$
$$\phantom{xxxx}CF_3\phantom{xxxxxxxx}O-L1-\|CCH=CH_2$$

| | a | b | c | L1 | A | Number Average Molecular Weight Mn (×10⁴) |
|---|---|---|---|---|---|---|
| P-21 | 55 | 45 | 0 | *—CH₂CH₂O—** | — | 1.8 |
| P-22 | 45 | 55 | 0 | *—CH₂CH₂O—** | — | 0.8 |
| P-23 | 50 | 45 | 5 | *—CH₂CH₂OC(O)NHCH₂CH₂O—** | —CH₂—CH(OCH₂CH₂OH)— | 0.7 |

-continued $$-(CF_2-CF)_a- \quad -(CF_2-CF)_b- \quad -(A)_c-$$
$$\quad\quad |\quad\quad\quad\quad\quad |$$
$$\quad\quad CF_3\quad\quad\quad\quad O-L1-\overset{O}{\overset{\|}{C}}CH=CH_2$$

| | a | b | c | L1 | A | Number Average Molecular Weight Mn ($\times 10^4$) |
|---|---|---|---|---|---|---|
| P-24 | 50 | 45 | 5 | *—CH$_2$CH(OH)—CH$_2$O—** | —CH$_2$—CH(O-CH$_2$-epoxide)— | 4.0 |
| P-25 | 50 | 45 | 5 | *—CH$_2$CH(CH$_2$OH)O—** | —CH$_2$—CH(O-CH$_2$-epoxide)— | 4.0 |
| P-26 | 50 | 40 | 10 | *—CH$_2$CH$_2$O—** | —CH$_2$—CH(OCH$_2$CH$_3$)— | 4.0 |
| P-27 | 50 | 40 | 10 | *—CH$_2$CH$_2$O—** | —CH$_2$—CH(O-cyclohexyl)— | 4.0 |
| P-28 | 50 | 40 | 10 | *—CH$_2$CH$_2$O—** | —CH(CH$_3$)—CH(COOH)— | 5.0 |

*denotes the polymer main chain side.
**denotes the acryloyl group side.

$$-(CF_2-CF)_x-$$
$$\quad\quad |$$
$$\quad\quad CF_3$$

$$-(CH_2-CH)_y-$$
$$\quad\quad |$$
$$\quad\quad O-(CH_2)_n O\overset{O}{\overset{\|}{C}}C=CH_2$$
$$\quad\quad\quad\quad\quad\quad\quad |$$
$$\quad\quad\quad\quad\quad\quad\quad X$$

$$-(CH_2-CH)_{z1}-$$
$$\quad\quad |$$
$$\quad\quad O-(CH_2)_n-OH$$

$$-(B)_{z2}-$$

| | x | y | z1 | z2 | n | X | B | Number Average Molecular Weight Mn ($\times 10^4$) |
|---|---|---|---|---|---|---|---|---|
| P-29 | 50 | 40 | 5 | 5 | 2 | H | —CH$_2$—CH(O—CH$_2$CH$_3$)— | 5.0 |
| P-30 | 50 | 35 | 5 | 10 | 2 | H | —CH$_2$—CH(O—C(CH$_3$)$_3$)— | 5.0 |

-continued

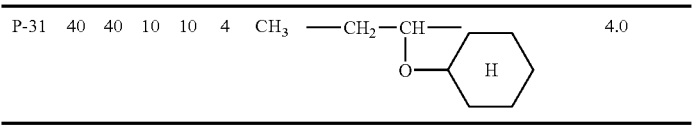

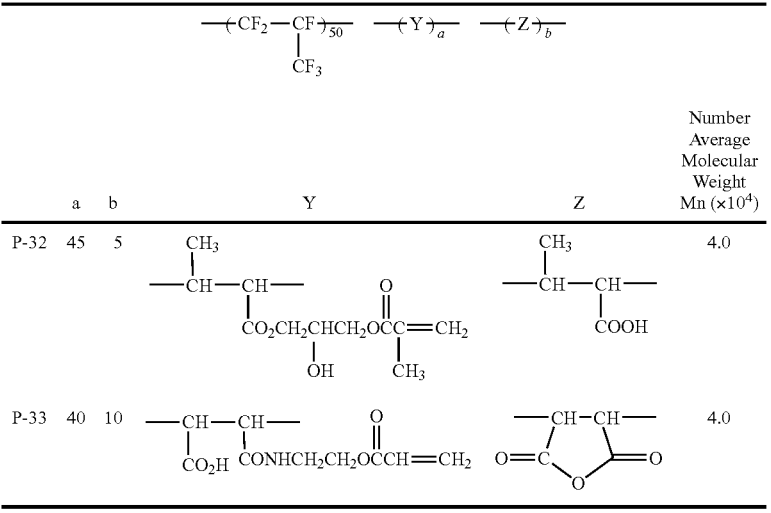

The synthesis of the copolymer as the fluorine-containing curable resin for use in the present invention can be performed by synthesizing a precursor such as hydroxyl group-containing polymer by various polymerization methods such as solution polymerization, precipitation polymerization, suspension polymerization, bulk polymerization and emulsion polymerization, and then introducing a (meth)acryloyl group by the above-described polymer reaction. The polymerization reaction can be performed by a known operation such as batch system, semi-continuous system and continuous system.

Examples of the method for initiating the polymerization include a method using a radical initiator and a method of irradiating light or radiation. These polymerization methods and polymerization-initiating methods are described, for example, in Teiji Tsuruta, Kobunshi Gosei Hoho (Polymer Synthesis Method), revised edition, Nikkan Kogyo Shinbun Sha (1971), and Takayuki Ohtsu and Masayoshi Kinoshita, Kobunshi Gosei no Jikken Ho (Test Method of Polymer Synthesis), pp. 124-154, Kagaku Dojin (1972).

Among these polymerization methods, a solution polymerization method using a radical initiator is preferred. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol, and one of these solvents may be used alone, or a mixture of two or more thereof may be used. A mixed solvent with water may also be used.

The polymerization temperature needs to be set according to the molecular weight of polymer produced, the kind of initiator, and the like, and a polymerization temperature from 0° C. or less to 100° C. or more may be used, but the polymerization is preferably performed in the range from 50 to 100° C.

The reaction pressure may be appropriately selected but is usually from 0.098 to 9.8 MPa (from 1 to 100 kg/cm$^2$), preferably on the order of 0.098 to 2.94 MPa (from 1 to 30 kg/cm$^2$). The reaction time is approximately from 5 to 30 hours.

The solvent for the reprecipitation of the polymer obtained is preferably isopropanol, hexane, methanol or the like.

As for the fluorine-containing curable resin, a commercially available product may also be used.

The amount used of the thus-obtained fluorine-containing curable resin is preferably from 10 to 98 mass %, more preferably from 30 to 95 mass %, based on the entire solid content of the coating composition for the low refractive index layer. Particularly, in the case of using an inorganic fine particle in combination, the amount used is preferably from 30 to 80 mass %, more preferably from 40 to 75 mass %.

(Coating Composition for Formation of Low Refractive Index Layer)

The coating composition for the formation of the low refractive index layer usually takes a liquid form and is produced by dissolving the above-describe inorganic fine particle and fluorine-containing curable resin which are preferably contained, and if desired, dissolving various additives and a radical polymerization initiator, in an appropriate solvent. The concentration of solid contents here may be appropriately selected according to the usage but is generally on the order of 0.01 to 60 mass %, preferably from 0.5 to 50 mass %, more preferably on the order of 1 to 20 mass %.

The radical polymerization initiator may be either a type which generates a radical under the action of heat, or a type which generates a radical under the action of light.

As for the compound which initiates the radical polymerization under the action of heat, an organic or inorganic peroxide, an organic azo or diazo compound, or the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2-azo-bis-isobutyronitrile, 2-azo-bis-propionitrile and 2-azo-bis-cyclohexanedinitrile; and examples of the diazo compound include diazoaminobenzene and p-nitrobenzenediazonium.

In the case of using a compound which initiates the radical polymerization under the action of light, the film is cured by the irradiation of ionizing radiation.

Examples of such a photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)butanone. Examples of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide. A sensitizing dye may also be preferably used in combination with such a photoradical polymerization initiator.

The amount added of the compound which initiates the radical polymerization under the action of heat or light is sufficient if it is an amount large enough to initiate the polymerization of the carbon-carbon double bond, and the amount added is preferably from 0.1 to 15 mass %, more preferably from 0.5 to 10 mass %, still more preferably from 2 to 5 mass %, based on the entire solid content in the composition for the formation of the low refractive index layer.

(Solvent)

The solvent contained in the coating composition for the low refractive index layer is not particularly limited as long as the fluorine-containing curable resin can be uniformly dissolved or dispersed without causing precipitation, and two or more kinds of solvent may also be used in combination. Preferred examples thereof include ketones (e.g., acetone, methyl ethyl ketone, methyl isobutyl ketone), esters (e.g., ethyl acetate, butyl acetate), ethers (e.g., tetrahydrofuran, 1,4-dioxane), alcohols (e.g., methanol, ethanol, isopropyl alcohol, butanol, ethylene glycol), aromatic hydrocarbons (e.g., toluene, xylene) and water.

(Other Compounds Suitably Contained in Coating Composition for Formation of Low Refractive Index Layer)

For the purpose of imparting properties such as antifouling property, water resistance, chemical resistance and slipperiness, known silicone-based or fluorine-based antifouling agents, slipping agents and the like may be appropriately added. In the case of adding such an additive, the additive is preferably added in an amount of 0 to 20 mass %, more preferably from 0 to 10 mass %, still more preferably from 0 to 5 mass %, based on the entire solid content of the low refractive index layer.

The low refractive index layer may contain an inorganic filler, a silane coupling agent, a slipping agent, a surfactant and the like. In particular, an inorganic fine particle, a silane coupling agent and a slipping agent are preferably contained.

As for the silane coupling agent, a compound represented by formula (I) and/or a derivative compound thereof may be used. A silane coupling agent containing a hydroxyl group, a mercapto group, a carboxy group, an epoxy group, an alkyl group, an alkoxysilyl group, an acyloxy group or an acylamino group is preferred, and a silane coupling agent containing an epoxy group, a polymerizable acyloxy group (e.g., (meth)acryloyl) or a polymerizable acylamino group (e.g., acrylamino, methacrylamino) is more preferred.

Among the compounds represented by formula (I), a compound having a (meth)acryloyl group as a crosslinking or polymerizable functional group is preferred, and examples thereof include 3-acryloxypropyltrimethoxysilane and 3-methacryloxypropyltrimethoxysilane.

The slipping agent is preferably a silicon compound such as dimethylsilicone, or a fluorine-containing compound having introduced thereinto a polysiloxane segment.

[Organosilyl Compound]

The organosilyl compound becomes a hydrolysate and/or a partial condensate by the hydrolysis and condensation in the coating composition for the formation of the low refractive index and not only acts as a binder in the composition but also enables softening of the film coating and increase of the alkali resistance.

In the present invention, the organosilyl compound preferably used in the coating composition for the formation of the low refractive index layer includes a compound represented by the following formula (1):

$R^{11}_m Si(X^{11})_n$            Formula (1)

(wherein $X^{11}$ represents —OH, a halogen atom, an —$OR^{12}$ group or an —$OCOR^{12}$ group, $R^{11}$ represents an alkyl group, an alkenyl group or an aryl group, $R^{12}$ represents an alkyl group, m+n is 4, m and n each represents a positive integer).

More specifically, $R^{11}$ represents a substituted or unsubstituted alkyl group having a carbon number of 1 to 10 (e.g., methyl, ethyl, propyl, i-propyl, butyl, hexyl, octyl), a substituted or unsubstituted alkenyl group having a carbon number of 2 to 10 (e.g., vinyl, allyl or 2-buten-1-yl) or a substituted or unsubstituted aryl group having a carbon number of 6 to 10 (e.g., phenyl, naphthyl), and $R^{12}$ represents a group having the same meaning as the alkyl group represented by $R^{11}$. In the case where the group represented by $R^{11}$ or $R^{12}$ has a substituent, preferred examples of the substituent include a halogen (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, allyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl), and an acylamino group (e.g., acetylamino, benzoylamino, acrylamino, methacrylamino).

The compound of formula (1) forms a matrix by a so-called sol-gel method comprising hydrolysis and mutual condensation. The compound of formula (1) is represented by the following four formulae.

$Si(X^{11})_4$            Formula (1a)

$R^{11}Si(X^{11})_3$            Formula (1b)

$R^{11}{}_2Si(X^{11})_2$  Formula (1c)

$R^{11}{}_3SiX^{11}$  Formula (1d)

The component of formula (1a) is specifically described below.

Specific examples of the compound represented by formula (1a) include tetramethoxysilane, tetraethoxysilane, tetra-i-propoxysilane, tetra-n-propoxysilane, tetra-n-butoxysilane, tetra-s-butoxysilane and tetra-tert-butoxysilane. In particular, tetramethoxysilane and tetraethoxysilane are preferred.

The component of formula (1b) is described below. In the component of formula (1b), $R^{11}$ represents a group having the same meaning as $R^{11}$ in formula (1), and examples thereof include an alkyl group such as methyl group, ethyl group, n-propyl group and i-propyl group, a γ-chloropropyl group, a vinyl group, $CF_3CH_2CH_2CH_2$—, $C_2F_5CH_2CH_2CH_2$—, $C_3F_7CH_2CH_2CH_2$—, $C_2F_5CH_2CH_2$—, $CF_3OCH_2CH_2CH_2$—, $C_2F_5OCH_2CH_2CH_2$—, $C_3F_7OCH_2CH_2CH_2$—, $(CF_3)_2CHOCH_2CH_2CH_2$—, $C_4F_9CH_2OCH_2CH_2CH_2$—, a 3-(perfluorocyclohexyloxy)propyl group, $H(CF_2)_4CH_2OCH_2CH_2CH_2$—, $H(CF_2)_4CH_2CH_2CH_2$—, a 3-glycidoxypropyl group, a 3-acryloxypropyl group, a 3-methacryloxypropyl group, a 3-mercaptopropyl group, a phenyl group and a 3,4-epoxycyclohexylethyl group.

$X^{11}$ represents —OH, a halogen atom, an —$OR^{12}$ group or an —$OCOR^{12}$ group. $R^{12}$ represents a group having the same meaning as $R^{12}$ in formula (I) and is preferably an alkoxy group having a carbon number of 1 to 5 or an acyloxy group having a carbon number of 1 to 4, and examples thereof include a chlorine atom, a methoxy group, an ethoxy group, an n-propyloxy group, an i-propyloxy group, an n-butyloxy group, an s-butyloxy group, a tert-butyloxy group and an acetyloxy group.

Specific examples of the component of formula (1b) include methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, 3-chloropropyltrimethoxysilane, 3-chloropropyltriethoxysilane, vinyltrimethoxysilane, vinyltriethoxysilane, 3-glycidoxypropyltrimethoxysilane, 3-glycidoxypropyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimethoxysilane, 3,4-epoxycyclohexylethyltriethoxysilane, $CF_3CH_2CH_2CH_2Si(OCH_3)_3$—, $C_2F_5CH_2CH_2CH_2Si(OCH_3)_3$—, $C_2F_5CH_2CH_2Si(OCH_3)_3$—, $C_3F_7CH_2CH_2CH_2Si(OCH_3)_3$—, $C_2F_5OCH_2CH_2CH_2Si(OCH_3)_3$—, $C_3F_7OCH_2CH_2CH_2Si(OC_2H_5)_3$—, $(CF_3)_2CHOCH_2CH_2CH_2Si(OCH_3)_3$—, $C_4F_9CH_2OCH_2CH_2CH_2Si(OCH_3)_3$—, $H(CF_2)_4CH_2OCH_2CH_2CH_2Si(OCH_3)_3$—, and 3-(perfluorocyclohexyloxy)propylsilane.

Among these, an organosilyl compound having a fluorine atom is preferred. In the case of using an organosilyl compound having no fluorine atom as $R^{11}$, methyltrimethoxysilane or methyltriethoxysilane is preferably used. One of these organosilyl compounds may be used alone, or two or more thereof may be used in combination.

The component of formula (1c) is described below. The component of formula (1c) is an organosilyl compound represented by the formula: $R^{11}{}_2Si(X^{11})_2$ {wherein $R^{11}$ and $X^{11}$ have the same meanings as $R^{11}$ and $X^{11}$ defined in the organosilyl compound used as the component of formula (1b)}. Here, the plurality of $R^{11}$'s may not be the same group.

Specific examples of this organosilyl compound include dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, diphenyldimethoxysilane, diphenyldiethoxysilane, $(CF_3CH_2CH_2)_2Si(OCH_3)_2$, $(CF_3CH_2CH_2CH_2)_2Si(OCH_3)_2$, $(C_3F_7OCH_2CH_2CH_2)_2Si(OCH_3)_2$, $[H(CF_2)_6CH_2OCH_2CH_2CH_2]_2Si(OCH_3)_2$ and $(C_2F_5OCH_2CH_2)_2Si(OCH_3)_2$. An organosilyl compound having a fluorine atom is preferred. In the case of using an organosilyl compound having no fluorine atom as $R^{11}$, dimethyldimethoxysilane or dimethyldiethoxysilane is preferred. One of the organosilyl compounds represented by the component of formula (1c) may be used alone, or two or more thereof may be used in combination.

The component of formula (1d) is described below. The component of formula (1d) is an organosilyl compound represented by the formula $R^{11}{}_3SiX^{11}$ {wherein $R^{11}$ and $X^{11}$ have the same meanings as $R^{11}$ and $X^{11}$ defined in the organosilyl compound used as the component of formula (1b)}. Here, the plurality of $R^{11}$'s may not be the same.

Specific examples of this organosilyl compound include trimethylmethoxysilane, trimethylethoxysilane, triethylmethoxysilane, triethylethoxysilane, tri-n-propylmethoxysilane, tri-n-propylethoxysilane, tri-i-propylmethoxysilane, tri-i-propylethoxysilane, triphenylmethoxysilane and triphenylethoxysilane.

In the present invention, the components of formulae (1a) to (1d) each may be used alone but may be used as a mixture and in this case, the blending ratio is such that the component (1b) is from 0 to 100 parts by mass, preferably from 1 to 60 parts by mass, more preferably from 1 to 40 parts by mass, per 100 parts by mass of the component (1a); the component (1c) is preferably from 0 to 10 parts by mass, more preferably from 0.1 to 5 parts by mass, still more preferably from 0.5 to 3 parts by mass, per 100 parts by mass of the component (1a); and the component (1d) is preferably from 0 to 10 parts by mass, more preferably from 0.1 to 5 parts by mass, still more preferably from 0.5 to 3 parts by mass, per 100 parts by mass of the component (1a). Out of the components (1a) to (1d), the proportion of the component (1a) is preferably 30 mass % or more in 100 mass % of the entire organosilyl compound. When the proportion of the component (1a) is 30 mass % or more, a problem such as reduction in the adhesion or curability of the film coating obtained does not arise and this is preferred. Other than the components of formulae (1a) to (1d), a compound described in JP-A-2006-30740, paragraphs [0039] and [0052] to [0067] may be preferably added or the coating composition for the formation of the low refractive index layer described therein may be preferably prepared.

(Formation of Low Refractive Index Layer)

The low refractive index layer is preferably formed by applying the coating composition having dissolved or dispersed therein the hollow particle, the fluorine-containing curable resin, the organosilyl compound and, if desired, other arbitrary components, and simultaneously with the coating or after the coating and drying, curing the coating through a crosslinking or polymerization reaction under the irradiation of ionizing radiation (for example, irradiation of light or irradiation of electron beam) or under heating.

In particular, when the low refractive index layer is formed through a crosslinking or polymerization reaction of an ionizing radiation-curable compound, the crosslinking or polymerization reaction is preferably performed in an atmosphere having an oxygen concentration of 10 vol % or less. By forming the low refractive index layer in an atmosphere having an oxygen concentration of 10 vol % or less, an outermost layer excellent in the physical strength and chemical resistance can be obtained.

The oxygen concentration is preferably 6 vol % or less, more preferably 4 vol % or less, still more preferably 2 vol % or less, and most preferably 1 vol % or less.

As for the means to reduce the oxygen concentration to 10 vol % or less, replacement of the atmospheric air (nitrogen concentration: about 79 vol %, oxygen concentration: about 21 vol %) with another gas is preferred, and replacement with nitrogen (nitrogen purging) is more preferred.

[Electrically Conductive Layer]

The antireflection film preferably has an electrically conductive layer from the standpoint of preventing static electricity on the film surface. The electrically conductive layer may be provided separately from the thin-film layer described above of the present invention or the thin-film layer may be made to serve also as the electrically conductive layer.

In the present invention, when the electrically conductive layer is a separate layer from the thin-film layer of the present invention, that is, the thin-film layer having a thickness and a refractive index satisfying formulae (I) to (III), the electrically conductive layer may be provided as a layer located between thin-film layers, as a layer located between the transparent support and a thin-film layer closest to the transparent support, or an upper layer of the thin-film layer close to the film surface. The thickness of the electrically conductive layer is preferably from 0.01 to 10 µm, more preferably from 0.03 to 7 µm, still more preferably from 0.05 to 5 µm. The materials used for the electrically conductive layer and the performance of the electrically conductive layer are describe in detail later.

In the present invention, at least one layer of the thin-film layers possessed by the antireflection can be formed as an electrically conductive layer. That is, at least any one layer of the low refractive layer, medium refractive index layer and high refractive index layer which are thin-film layers may be formed as an electrically conductive layer by imparting electrically conductivity thereto. In this case, the materials of the electrically conductive layer are preferably selected so that the thickness and refractive index of the layer can satisfy the condition of the pertinent layer in formulae (I) to (III). The low refractive index layer is the surface layer or a layer close to the surface of the antireflection film and therefore, when electrically conductivity is imparted, this is most preferred from the standpoint of preventing static electricity. However, there is a problem that in many cased, the electrically conductive particle or compound is a material having high refractive index and a desired low refractive index can be hardly obtained. Since the electrically conductive particle or compound is a material having high refractive index layer, electrical conductivity can be easily imparted to the medium or high refractive index layer. The low refractive index layer, medium refractive index layer or high refractive index layer imparted with electrical conductivity preferably has a surface resistance value satisfying formula (4) described below.

The materials used for the electrically conductive layer and the performance of the electrically conductive layer are describe in detail below.

Examples of the method for forming the electrically conductive layer include conventionally known methods such as a method of applying an electrically conductive coating solution containing an electrically conductive fine particle and a reactive curable resin, a method of coating a transparent electrically conductive material comprising a transparent polymer having electrical conductivity, and a method of vapor-depositing or sputtering a meta, a metal oxide or the like capable of forming a transparent film to form an electrically conductive thin film. The electrically conducive layer may be formed on the transparent support directly or through a primer layer which affords firm adhesion to the transparent support. In the case of providing the electrically conductive layer as a layer close to the outermost surface layer of the antireflection film, the antistatic property can be satisfactorily obtained even when the layer thickness is small and this is preferred. In the present invention, at least one thin-film layer or a layer located between the transparent support and a thin-film layer closed to the transparent support out of the thin-film layers is preferably an electrically conductive layer. The coating method is not particularly limited, and an optimal method may be selected from known methods such as roll coating, gravure coating, bar coating and extrusion coating, according to the characteristics of the coating solution and the coated amount.

The electrically conductive layer preferably has a surface resistance (SR) satisfying the following formula (4):

$$\text{Log } SR \leq 12 \qquad \text{Formula (4)}$$

The log SR is preferably from 5 to 12, more preferably from 5 to 9, and most preferably from 5 to 8. The surface resistance (SR) of the electrically conductive layer can be measured by a four-probe method or a circular electrode method.

The electrically conductive layer is preferably substantially transparent. Specifically, the haze of the electrically conductive layer is preferably 10% or less, more preferably 5% or less, still more preferably 3% or less, and most preferably 1% or less. Furthermore, the transmittance for light at a wavelength of 550 nm is preferably 50% or more, more preferably 60% or more, still more preferably 65% or more, and most preferably 70% or more.

1. Transparent Electrically Conductive Material Being Transparent and Having Electrical Conductivity The transparent electrically conductive material is a transparent substance having electrical conductivity and comprising a polymer and is a single material or a composite of a plurality of materials.

The transparent electrically conductive material is preferably a cationic or anionic polymer exhibiting ionic electrical conductivity, or a composite of a π-conjugated electrically conductive polymer exhibiting electron conductivity and a dopant attached thereto. A composite of a π-conjugated electrically conductive polymer and a dopant attached thereto is more preferred.

1-(1) π-Conjugated Electrically Conductive Polymer

As for the π-conjugated electrically conductive polymer, an organic polymer may be used as long as the main chain is composed of a π-conjugate system. Examples thereof include polypyrroles, polythiophenes, polyacetylenes, polyphenylenes, polyphenylene vinylenes, polyanilines, polyacenes, polythiophene vinylenes, and copolymers thereof. In view of ease of polymerization and stability in the air, polypyrroles, polythiophenes and polyanilines are preferred.

The π-conjugated electrically conductive polymer, even when unsubstituted, may have sufficient electrical conductivity and compatibility with the binder resin, but in order to more increase the electrical conductivity and dispersibility or solubility in the binder resin, a functional group such as alkyl group, carboxyl group, sulfo group, alkoxy group, hydroxyl group and cyano group is preferably introduced into the π-conjugated electrically conductive polymer.

As for specific examples of the π-conjugated electrically conductive polymer, examples of the polypyrroles include poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polythiophenes include poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioetyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene) and poly(3-methyl-4-carboxybutylthiophene).

Examples of the polyanilines include poly(2-methylaniline), poly(3-isobutylaniline), poly(2-anilinesulfonic acid) and poly(3-anilinesulfonic acid).

Among these, a (co)polymer comprising one or two species selected from polypyrrole, polythiophene, poly(N-methylpyrrole), poly(3-methylthiophene), poly(3-methoxythiophene) and poly(3,4-ethylenedioxythiophene) is suitably used in view of resistance value and reactivity. Polypyrrole and poly(3,4-ethylenedioxythiophene) are more preferred, because the electrical conductivity is higher and the heat resistance is enhanced.

Also, an alkyl-substituted compound such as poly(N-methylpyrrole) and poly(3-methylthiophene) enhances the solvent solubility or the compatibility or dispersibility with the binder resin and is more preferred. Among the alkyl groups, methyl group is preferred because of no adverse effect on the electrical conductivity.

1-(2) Dopant

The transparent electrically conductive material is preferably a composite of the above-described π-conjugated electrically conductive polymer and a dopant.

The dopant is preferably a polymer dopant, and a polyanion having an anionic group within the molecule is more preferred as the dopant.

Hereinafter, the dopant comprising a polyanion is referred to as a polyanion dopant. The polyanion dopant forms a composite by causing chemical oxidation doping into an electrically conductive polymer and thereby forming a salt.

The anion group of the polyanion dopant is preferably a functional group which causes chemical oxidation doping into an electrically conductive polymer and in which the protonic acid of the anion group is bondable to any of a vinyl group, a glycidyl group and a hydroxyl group. Specifically, the anion group is preferably a sulfuric acid group, a phosphoric acid group, a sulfo group, a carboxy group or a phospho group, and in view of chemical oxidation doping, more preferably a sulfo group or a carboxyl group.

Examples of the polyanion dopant having a sulfo group include a polyvinyl sulfonic acid, a polystyrene sulfonic acid, a polyallyl sulfonic acid, a polyacryl sulfonic acid, a polymethacryl sulfonic acid, a poly-2-acrylamido-2-methylpropane sulfonic acid, and a polyisoprene sulfonic acid. These may be a homopolymer or a copolymer of two or more thereof.

Examples of the polyanion dopant having a carboxy group include a polyvinyl carboxylic acid, a polystyrene carboxylic acid, a polyallyl carboxylic acid, a polyacryl carboxylic acid, a polymethacryl carboxylic acid, a poly-2-acrylamido-2-methylpropane carboxylic acid, a polyisoprene carboxylic acid and a polyacrylic acid. These may be a homopolymer or a copolymer of two or more thereof.

The transparent electrically conductive material can be easily produced by polymerizing through chemical oxidation a precursor monomer for forming the π-conjugated electrically conductive polymer in a solvent in the presence of an appropriate oxidant, an appropriate oxidation catalyst and the above-described polymer dopant (preferably polyanion).

For more enhancing the electrical conductivity and thermal stability, the electrically conductive material may contain a dopant other than the polyanion dopant. Examples of this dopant include a halogen compound, a Lewis acid and a protonic acid, and specific examples thereof include an organic acid such as organic carboxylic acid and organic sulfonic acid, an organic cyano compound, and a fullerene compound.

Examples of the halogen compound include chlorine, bromine, iodine, iodine chloride, iodine bromide and iodine fluoride.

Examples of the protonic acid include an inorganic acid such as hydrochloric acid, sulfuric acid, nitric acid, phosphoric acid, borohydrofluoric acid, hydrofluoric acid and perchloric acid, an organic carboxylic acid, phenols, and an organic sulfonic acid.

Examples of the organic carboxylic acid include a formic acid, an acetic acid, an oxalic acid, a benzoic acid, a phthalic acid, a maleic acid, a fumaric acid, a malonic acid, a tartaric acid, a citric acid, a lactic acid, a succinic acid, a monochloroacetic acid, a dichloroacetic acid, a trichloroacetic acid, a trifluoroacetic acid, a nitroacetic acid and a triphenylacetic acid.

Examples of the organic sulfonic acid include an alkylbenzenesulfonic acid, an Alkylnaphthalenesulfonic acid, an alkylnaphthalenedisulfonic acid, a naphthalenesulfonic acid-formalin polycondensate, a melaminesulfonic acid-formalin polycondensate, a naphthalenedisulfonic acid, a naphthalenetrisulfonic acid, a dinaphthylmethanedisulfonic acid, an anthraquinonesulfonic acid, an anthraquinone-disulfonic aid, an anthracenesulfonic acid and a pyrenesulfonic acid. Metal salts thereof may also be used.

Examples of the organic cyano compound include dichlorodicyanobenzoquinone (DDQ), tetracyanoquinodimethane and tetracyanoazanaphthalene.

Examples of the fullerene compound include fullerene hydride, fullerene hydroxide, fullerene carboxylate, and fullerene sulfonate.

The polymer dopant is preferably crosslinked with a crosslinking site-forming compound described later, whereby the adhesion of the electrically conductive layer is increased and excellent scratch resistance can be realized.

Also, the polymer dopant preferably has two kinds of functional groups, where at least one kind of a functional group is an anionic group and at least other one kind of a functional group is not an anionic group.

Out of the functional groups in the polymer dopant, the remaining anionic group not forming a salt with the π-conjugated electrically conductive polymer, or a group which is not the anionic group, is preferably crosslinked with a crosslinking site-forming compound described later.

The functional group in the polymer dopant, which is not an anionic group, is not particularly limited as long as it is a group capable of crosslinking with a crosslinking site-forming compound, but examples thereof include a hydroxyl group, an amino group and a mercapto group, and these functional groups each is introduced by copolymerizing a 2-vinyl ethanol, a (hydroxymethyl) vinyl ketone, a (2-hydroxyethyl) vinyl ketone, an allylamine, a 2-aminoethyl vinyl ether, a 3-vinyloxy-1-propaneamine, a 2-allylaminoethane thiol or the like with the polymer dopant. The copolymerization ratio of the monomer having a functional group which is not an anionic group is preferably from 1 to 50 mol %, more preferably from 5 to 30 mol %. If the copolymerization ratio is less than 1 mol %, the number of crosslinking sites is insufficient, whereas if it exceeds 50 mol %, the dopant does not satisfactorily function as an anion dopant.

1-(3) Composite Comprising π-Conjugated Electrically Conductive Polymer and Polymer Dopant The composite of a π-conjugated electrically conductive polymer and a polymer dopant is described below by referring to a polyanion dopant as an example.

At the formation of the composite, the anion group of the polyanion dopant forms a salt with the electrically conductive polymer along with the growth of the main chain of the electrically conductive polymer and therefore, the main chain of the electrically conductive polymer grows along the polyanion dopant. As a result, the electrically conductive polymer and polyanion dopant become a composite where numerous salts are formed. In this composite, it is presumed that 1 unit of the anion group and 3 units of the monomer of the electrically conductive polymer form a salt and several electrically conductive polymers grown short are forming the salt along the long polyanion dopant.

Examples of the method for forming a composite where the electrically conductive polymer and the polyanion dopant are compounded include a method of polymerizing through chemical oxidation a monomer for the formation of an electrically conductive polymer in the presence of a polyanion dopant.

The oxidant and oxidation catalyst used for polymerizing a monomer in the polymerization by chemical oxidation may be sufficient if the precursor monomer can be oxidized and the π-conjugated electrically conductive polymer can be obtained. Examples thereof include a peroxodisulfate such as ammonium peroxodisulfate, sodium peroxodisulfate and potassium peroxodisulfate; a transition metal compound such as ferric chloride, ferric sulfate, ferric nitrate and cupric chloride; a metal halide compound such as boron trifluoride and aluminum chloride; a metal oxide such as silver oxide and cesium oxide; a peroxide such as hydrogen peroxide and ozone; an organic peroxide such as benzoyl peroxide; and oxygen.

The polymerization by chemical oxidation may be performed in a solvent, and the solvent used here is not particularly limited as long as it dissolves the polyanion dopant and the electrically conductive polymer. Examples thereof include water, methanol, ethanol, propylene carbonate, cresol, phenol, xylenol, acetone, methyl ethyl ketone, hexane, benzene, toluene, dioxane, diethyl ether, acetonitrile, benzonitrile, N,N-dimethylformamide, N,N-dimethylacetamide, N-methyl-2-pyrrolidone, hexamethylphosphoric triamide, 1,3-dimethyl-2-imidazolidine, dimethylimidazoline, ethyl acetate, 2-methyltetrahydrofuran, dioxane, dimethylsulfoxide, sulfolane and diphenyl sulfone. One kind of these solvents may be used, or a mixed solvent of two or more kinds thereof may be used.

The coated amount of the transparent electrically conductive material is preferably from 0.01 to 5.0 $g/m^2$, more preferably from 0.05 to 2.0 $g/m^2$, and most preferably from 0.10 to 1.0 $g/m^2$.

Also, in the case where the transparent electrically conductive material is a composite of the π-conjugated electrically conductive polymer and the polymer dopant, the ratio between the molecular weight per unit of the π-conjugated electrically conductive polymer and the molecular weight per unit of the polymer dopant is preferably from 1:1 to 15, more preferably from 1:1 to 1:2.

2. Electrically Conductive Inorganic Fine Particle of Electrically Conductive Layer The electrically conductive layer may be formed using a coating composition obtained by dissolving an electrically conductive fine particle and a reactive curable resin. In this case, the electrically conductive inorganic fine particle is preferably formed of a metal oxide or nitride. Examples of the metal oxide or nitride include tin oxide, indium oxide, zinc oxide and titanium nitride. Among these, tin oxide and indium oxide are preferred. The electrically conductive inorganic fine particle comprises such a metal oxide or nitride as the main component and may further contain other elements. The main component means a component having a largest content (mass %) out of the components constituting the particle. Examples of the other element include Ti, Zr, Sn, Sb, Cu, Fe, Mn, Pb, Cd, As, Cr, Hg, Zn, Al, Mg, Si, P, S, B, Nb, In, V and a halogen atom. In order to enhance the electrical conductivity of tin oxide or indium oxide, at least one element selected from Sb, P, B, Nb, In, V and a halogen atom is preferably added. An Sb-containing tin oxide (ATO) and an Sn-containing indium oxide (ITO) are particularly preferred. The proportion of Sb in ATO is preferably from 3 to 20 mass %, and the proportion of Sn in ITO is preferably from 5 to 20 mass %.

The average primary particle diameter of the electrically conductive inorganic fine particle for use in the electrically conductive layer is preferably from 1 to 150 nm, more preferably from 5 to 100 nm, and most preferably from 5 to 70 nm. The average particle diameter of the electrically conductive inorganic fine particle in the electrically conductive layer formed is from 1 to 200 nm, preferably from 5 to 150 nm, more preferably from 10 to 100 nm, and most preferably from 10 to 80 nm. The average particle diameter of the electrically conductive inorganic fine particle is an average diameter weighed by the mass of the particle and can be measured by a light scattering method or an electron micrograph.

The electrically conductive inorganic fine particle may be surface-treated. The surface treatment is performed using an inorganic compound or an organic compound. Examples of the inorganic compound for use in the surface treatment include alumina and silica. A silica treatment is preferred. Examples of the organic compound for use in the surface treatment include a polyol, an alkanolamine, a stearic acid, a silane coupling agent and a titanate coupling agent, with a silane coupling agent being most preferred. Two or more kinds of surface treatments may be practiced in combination.

The shape of the electrically conductive inorganic fine particle is preferably rice grain-like, spherical, cubic, spindle-like or amorphous.

Two or more kinds of electrically conductive inorganic fine particles may be used in combination in the electrically conductive layer.

The proportion of the electrically conductive inorganic fine particle in the electrically conductive layer is preferably from 20 to 90 mass %, more preferably from 25 to 85 mass %, still more preferably from 30 to 80 mass %, based on the entire solid content.

The electrically conductive inorganic fine particle is used in a dispersion state for the formation of the electrically conductive layer. The dispersion medium for the electrically conductive inorganic fine particle is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran), and an ether alcohol (e.g., 1-methoxy-2-propanol). Among these, toluene, xylene, methyl ethyl ketone, methyl isobutyl ketone, cyclohexanone and butanol are preferred. The electrically conductive inorganic fine particle may be dispersed using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. A preliminary dispersion treatment may also be performed. Examples of the disperser for use in the preliminary dispersion treatment include a ball mill, a three-roll mill, a kneader and an extruder.

(Binder of Electrically Conductive Layer)

As for the binder of the electrically conductive layer, a curable resin used in the high refractive index layer, particularly, an ionizing radiation-curable polyfunctional monomer or polyfunctional oligomer, is preferably used. A crosslinked polymer obtained by reacting a reactive curable resin may also be used as the binder. The crosslinked polymer preferably has an anionic group.

The crosslinked polymer having an anionic group has a structure that the main chain of the polymer having an anionic group is crosslinked. The anionic group has a function of maintaining the dispersed state of the electrically conductive inorganic fine particle, and the crosslinked structure has a function of imparting a film-forming ability to the polymer and strengthening the electrically conductive layer.

Examples of the polymer main chain include polyolefin (saturated hydrocarbon), polyether, polyurea, polyurethane, polyester, polyamine, polyamide and melamine resin. A polyolefin main chain, a polyether main chain and a polyurea main chain are preferred, a polyolefin main chain and a polyether main chain are more preferred, and a polyolefin main chain is most preferred.

The polyolefin main chain comprises a saturated hydrocarbon. The polyolefin main chain is obtained, for example, by the addition polymerization reaction of an unsaturated polymerizable group. In the polyether main chain, repeating units are connected through an ether bond (—O—). The polyether main chain is obtained, for example, by the ring-opening polymerization reaction of an epoxy group. In the polyurea main chain, repeating units are connected through a urea bond (—NH—CO—NH—). The polyurea main chain is obtained, for example, by the condensation polymerization reaction of an isocyanate group and an amino group. In the polyurethane main chain, repeating units are connected through a urethane bond (—NH—CO—O—). The polyurethane main chain is obtained, for example, by the condensation polymerization reaction of an isocyanate group and a hydroxyl group (including an N-methylol group). In the polyester main chain, repeating units are connected through an ester bond (—CO—O—). The polyester main chain is obtained, for example, by the condensation polymerization reaction of a carboxyl group (including an acid halide group) and a hydroxyl group (including an N-methylol group). In the polyamine main chain, repeating units are connected through an imino bond (—NH—). The polyamine main chain is obtained, for example, by the ring-opening polymerization reaction of an ethyleneimine group. In the polyamide main chain, repeating units are connected through an amido bond (—NH—CO—). The polyamide main chain is obtained, for example, by the reaction of an isocyanate group and a carboxyl group (including an acid halide group). The melamine resin main chain is obtained, for example, by the condensation polymerization reaction of a triazine group (e.g., melamine) and an aldehyde (e.g., formaldehyde). Incidentally, in the melamine resin, the main chain itself has a crosslinked structure.

The anionic group is bonded directly to the polymer main chain or bonded to the main chain through a linking group. The anionic group is preferably bonded as a side chain to the main chain through a linking group.

Examples of the anionic group include a carboxylic acid group (carboxyl), a sulfonic acid group (sulfo) and a phosphoric acid group (phosphono), and a sulfonic acid group and a phosphoric acid group are preferred.

The anionic group may be in a salt sate. The cation forming the salt with the anionic group is preferably an alkali metal ion. Also, the proton of the anionic group may be dissociated.

The linking group connecting the anionic group and the polymer main chain is preferably a divalent group selected from —CO—, —O—, an alkylene group, an arylene group and a combination thereof.

The crosslinked forms chemical bonding (preferably covalent bonding) of two or more main chains. The crosslinked structure preferably forms covalent bonding of three or more main chains. The crosslinked is preferably composed of a divalent or greater group selected from —CO—, —O—, —S—, a nitrogen atom, a phosphorus atom, an aliphatic residue, an aromatic residue and a combination thereof.

The crosslinked polymer having an anionic group is preferably a copolymer comprising a repeating unit having an anionic group and a repeating unit having a crosslinked structure. In the copolymer, the proportion of the repeating unit having an anionic group is preferably from 2 to 96 mass %, more preferably from 4 to 94 mass %, and most preferably from 6 to 92 mass %. The repeating unit may have two or more anionic groups. In the copolymer, the proportion of the repeating unit having a crosslinked structure is preferably from 4 to 98 mass %, more preferably from 6 to 96 mass %, and most preferably from 8 to 94 mass %.

The repeating unit of the crosslinked polymer having an anionic group may have both an anionic group and a crosslinked structure. Also, other repeating units (a repeating unit having neither an anionic group nor a crosslinked unit) may be contained.

Other repeating units are preferably a repeating unit having an amino group or a quaternary ammonium group and a repeating unit having a benzene ring. The amino group or quaternary ammonium group has, similarly to the anionic group, maintaining the dispersed state of the inorganic fine particle. Incidentally, the same effects can be obtained even when the amino group, quaternary ammonium group or benzene ring is contained in the repeating unit having an anion group or in the repeating unit having a crosslinked structure.

In the repeating unit having an amino group or a quaternary ammonium group, the amino group or quaternary ammonium group is bonded directly to the polymer main chain or bonded to the main chain through a linking group. The amino group or quaternary ammonium group is preferably bonded as a side chain to the main chain through a linking group. The amino group or quaternary ammonium group is preferably a secondary amino group, a tertiary amino group or a quaternary ammonium group, more preferably a tertiary amino group or a quaternary ammonium group. The group bonded to the nitrogen atom of the secondary or tertiary amino group or quaternary ammonium group is preferably an alkyl group, more preferably an alkyl group having a carbon atom number of 1 to 12, still more preferably an alkyl group having a carbon atom number of 1 to 6. The counter ion of the quaternary ammonium group is preferably a halide ion. The linking group connecting the amino group or quaternary ammonium group and the polymer main chain is preferably a divalent group selected from —CO—, —NH—, —O—, an alkylene group, an arylene group and a combination thereof. In the case where the crosslinked polymer having an anionic group contains a repeating unit having an amino group or a quaternary ammonium group, the proportion of the repeating unit is preferably from 0.06 to 32 mass %, more preferably from 0.08 to 30 mass %, and most preferably from 0.1 to 28 mass %.

The above-described binder may also be used in combination with the following reactive organosilicon compound described, for example, in JP-A-2003-39586. The reactive organosilicon compound is used in an amount of 10 to 70 mass % based on the ionizing radiation-curable resin as the binder above. The reactive organosilicon compound is preferably an organosilane compound represented by formula (I), more preferably an organosilane compound represented by formula (II), and an electrically conductive layer can be formed by using only this compound as the resin component.

[Hardcoat Layer]

In the present invention, a hardcoat layer is preferably provided between the transparent support and the thin-film layer (out of thin-film layers, a layer closest to the transparent support) so as to impart physical strength to the antireflection film. In particular, the hardcoat layer is preferably provided between the transparent support and the high refractive index layer (or medium refractive index layer). The thickness of the hardcoat layer is preferably from 1 to 30 μm.

The hardcoat layer is preferably formed through a crosslinking reaction or polymerization reaction of an ionizing radiation-curable compound. For example, a coating composition containing an ionizing radiation-curable polyfunctional monomer or polyfunctional oligomer is coated on a transparent support, and a crosslinking reaction or polymerization reaction of the polyfunctional monomer or polyfunctional oligomer is brought about, whereby the hardcoat layer can be formed.

The functional group in the ionizing radiation-curable polyfunctional monomer or polyfunctional oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred. Also, the hardcoat layer may contain an inorganic fine particle.

Specific examples of the photopolymerizable polyfunctional monomer having a photopolymerizable functional group include those described for the high refractive index layer, and the monomer is preferably polymerized using a photopolymerization initiator or a photosensitizer. The photopolymerization reaction is preferably performed by the ultraviolet irradiation after coating and drying the hardcoat layer.

In the hardcoat layer, either one or both of an oligomer and a polymer each having a mass average molecular weight of 500 or more may be added so as to impart brittleness.

Examples of the oligomer and polymer include a (meth)acrylate-based polymer, a cellulose-based polymer, a styrene-based polymer, a urethane acrylate and a polyester acrylate. For example, a poly(glycidyl(meth)acrylate) or poly(allyl(meth)acrylate) having a functional group in the side chain is preferred.

The total amount of the oligomer and polymer in the hardcoat layer is preferably from 5 to 80 mass %, more preferably from 25 to 70 mass %, still more preferably from 35 to 65 mass %, based on the entire mass of the hardcoat layer.

The strength of the hardcoat layer is preferably H or more, more preferably 2H or more, and most preferably 3H or more, in the pencil hardness test according to JIS K5400.

Furthermore, in the Taber test according to JIS K5400, the abrasion loss of the specimen between before and after test is preferably smaller.

In forming the hardcoat layer, when the hardcoat layer is formed through a crosslinking or polymerization reaction of an ionizing radiation-curable compound, the crosslinking or polymerization reaction is preferably performed in an atmosphere having an oxygen concentration of 10 vol % or less. By forming the hardcoat layer in an atmosphere having an oxygen concentration of 10 vol % or less, a hardcoat layer excellent in the physical strength and chemical resistance can be formed and this is preferred.

The hardcoat layer is more preferably formed through a crosslinking or polymerization reaction of an ionizing radiation-curable compound in an atmosphere having an oxygen concentration of 6 vol % or less, more preferably 4 vol % or less, still more preferably 2 vol % or less, and most preferably 1 vol % or less.

As for the means to reduce the oxygen concentration to 10 vol % or less, replacement of the atmospheric air (nitrogen concentration: about 79 vol %, oxygen concentration: about 21 vol %) with another gas is preferred, and replacement with nitrogen (nitrogen purging) is more preferred.

The hardcoat layer is preferably formed on the transparent support surface by applying the coating composition for the formation of the hardcoat layer.

The coating solvent is preferably a ketone-based solvent exemplified for the high refractive index layer. By the use of a ketone-based solvent, the adhesion of the hardcoat layer to the surface of the transparent support (particularly, triacetyl cellulose transparent support) is more improved.

The coating solvent is more preferably methyl ethyl ketone, methyl isobutyl ketone or cyclohexanone.

The coating solvent may contain a solvent other than the ketone-based solvent exemplified for the high refractive index layer.

As for the coating solvent, the content of the ketone-based solvent is preferably 10 mass % or more, more preferably 30 mass % or more, still more preferably 60 mass % or more, based on all solvents contained in the coating composition.

[Other Layers of Antireflection Film]

In the antireflection film, layers other than those described above may also be provided. For example, an adhesive layer, a shield layer, a slipping layer, a light-diffusing layer and an antiglare layer may be provided. The shield layer is provided for shielding an electromagnetic wave or an infrared ray.

[Formation Method, etc. of Antireflection Film]

The layers of the antireflection film each may be formed by coating a coating solution for each layer on a transparent support by a dip coating method, an air knife coating method, a curtain coating method, a roller coating method, a die coating method, a wire bar coating method, or a gravure coating method.

Among these coating systems, in order to increase the uniformity of the film coating, a gravure coating method and a die coating method are preferred.

Of gravure coating methods, a microgravure method is more preferred. The die coating method is particularly preferred because this is a total weighing system enabling relatively easy control of the layer thickness and causes less evaporation of the solvent in the coating part. In the case of continuously forming multiple layers, a tandem system may be employed.

In the die coating method, two or more layers can be simultaneously coated. The method for simultaneous coating by the die coating method is described in U.S. Pat. Nos. 2,761,791, 2,941,898, 3,508,947 and 3,526,528, and Yuji Harasaki, *Coating Kogaku* (*Coating Engineering*), page 253, Asakura Shoten (1973), and those described therein may be used.

In the die coating method, one extrusion-type or slide-type die may be used alone or a combination of such dies may be used. Of these dies, an extrusion-type die (also called a slot die) is preferred. As for the design of the die, the overbite system described in detail in JP-A-2003-211052 and JP-A-2006-122889, paragraphs 0344 to 0427, is preferably employed.

[Protective Film for Polarizing Plate]

In the case of using the antireflection film as a surface protective film of a polarizing film protective film for polarizing plate), the adhesion to the polarizing film comprising a polyvinyl alcohol as the main component can be improved by hydrophilizing the surface of the transparent support opposite the side having the thin-film layer, that is, the surface on the side to be laminated with the polarizing film.

It is also preferred that out of two protective films of the polarizer, the film other than the antireflection film is an optically compensatory film having an optically compensatory layer comprising an optically anisotropic layer. The optically compensatory film (phase difference film) can improve the viewing angle characteristics on the liquid crystal display screen.

A known optically compensatory film may be used but from the standpoint of enlarging the viewing angle, the optically compensatory film described in JP-A-2001-100042 is preferred.

In the case of using the antireflection film as a surface protective film of a polarizing film (protective film for polarizing plate), the transparent support is preferably a triacetyl cellulose film.

The method for producing the protective film for polarizing plate in the present invention includes three methods, that is, (1) a method of coating the layers (for example, a high refractive index layer, a low refractive index layer, preferably a hardcoat layer, and the like, in other words, layers except for the transparent support in the antireflection film; hereinafter sometimes referred to as "antireflection layers") on one surface of a transparent support previously subjected to a saponification treatment, (2) a method of coating antireflection layers on one surface of a transparent support and subjecting the side to be laminated with a polarizing film or both surfaces to a saponification treatment, and (3) a method of coating a part of antireflection layers on one surface of a transparent support, subjecting the side to be laminated with a polarizing film or both surfaces to a saponification treatment, and then coating the remaining layers. In the method of (1), the surface where antireflection layers are coated is also hydrophilized and the adhesion between the transparent support and the antireflection film can be hardly ensured. Therefore, the method of (2) is preferred.

(Saponification Treatment)

The saponification treatment method includes the following two methods.

(1) Dipping Method

This is a method of dipping the antireflection film in an alkali solution under appropriate conditions to saponify all the surface having reactivity with an alkali on the entire film surface. This method requires no special equipment and is preferred in view of cost. The alkali solution is preferably an aqueous sodium hydroxide solution. The concentration is preferably from 0.5 to 3 mot/L, more preferably from 1 to 2 mol/L. The liquid temperature of the alkali solution is preferably from 30 to 70° C., more preferably from 40 to 60° C.

The combination of the saponification conditions is preferably a combination of relatively mild conditions but may be selected according to the materials or construction of the antireflection film or the objective contact angle.

The film after dipping in an alkali solution is preferably well washed with water or dipped in a dilute acid to neutralize the alkali component and allow for no remaining of the alkali component in the film.

By applying a saponification treatment, the surface of the transparent support opposite the surface having antireflection layers is hydrophilized. The protective film for polarizing plate is used by bonding the hydrophilized surface of the transparent support to a polarizing film.

The hydrophilized surface is effective for improving the adhesion to the adhesive layer comprising polyvinyl alcohol as the main component.

As for the saponification treatment, the contact angle for water on the transparent support surface opposite the surface having the high refractive index layer is preferably lower in view of adhesion to the polarizing film, but, on the other hand, in the dipping method, even the surface having the high refractive index layer is damaged simultaneously by an alkali and therefore, it is important to select minimum necessary reaction conditions. When the contact angle for water on the transparent support surface opposite the side having antireflection layers, that is, on the lamination surface of the antireflection film, is used as the index for damage of antireflection layers by an alkali, in the case particularly where the transparent support is triacetyl cellulose, the contact angle for water is preferably from 20 to 50°, more preferably from 30 to 50°, still more preferably from 40 to 50°. The contact angle for water is preferably in this range, because sufficient adhesion to the polarizing film can be maintained, the antireflection film is less damaged, the physical strength and light resistance can be satisfactorily maintained. Also, for preventing the alkali solution from causing various adverse effects such as corrosion, dissolution and separation on the antireflection layers, a saponification system of protecting the antireflection layer side with a laminate film and preventing the damage is preferably used. The kind of the antireflection layer when employing this system is not particularly limited, but in the case of forming the antireflection layer from a vapor-deposition film or a sol-gel film, this system is particularly preferred.

(2) Alkali Solution Coating Method

In order to avoid the damage of the antireflection film in the dipping method, an alkali solution coating method where only the surface opposite the surface having the antireflection film is coated with an alkali solution under appropriate conditions and the film is then heated, water-washed and dried, is preferably used. In this case, the "coating" means to contact an alkali solution or the like only with the surface to be saponified, and the saponification treatment is preferably performed such that the contact angle for water on the lamination surface of the antireflection film becomes from 10 to 50°. The coating includes spraying and contact with a belt or the like impregnated with the solution, other than coating. Since the alkali solution comes into contact only with the surface to be saponified, a layer using a material weak to an alkali solution can be provided on the opposite surface. The kind of the antireflection layer when employing this system is not limited but in the case of forming the antireflection layer from a vapor-deposition film or a sol-gel film, these layers can be prevented from occurrence of various adverse effects such as corrosion, dissolution and separation and this system is particularly preferred.

The saponification methods (1) and (2) both can be performed after unrolling a rolled support and forming antireflection layers and therefore, the treatment may be added after the antireflection film production step and performed in a series of operations. Furthermore, by continuously performing also the step of laminating the antireflection film to a polarizing plate comprising a support unrolled similarly, a polarizing plate can be produced with higher efficiency than in the case of performing the same operations in the sheet-fed manner.

[Polarizing Plate]

The polarizing plate of the present invention is described below.

The polarizing plate of the present invention is a polarizing plate comprising a polarizer sandwiched by two surface protective films, wherein the antireflection film of the present invention is used as one of those surface protective films.

One preferred embodiment of the polarizing plate of the present invention is described below. The polarizing plate in a preferred embodiment has the antireflection film of the present invention as at least one protective film of a polarizing film (protective film for polarizing plate). More specifically, this is a construction where the transparent support (1) of the antireflection film shown in the drawing is adhered to a polarizing film, if desired, through an adhesive layer comprising a polyvinyl alcohol and a protective film is provided also on another side of the polarizing film. On the surface of the another protective film opposite the polarizing film, an adhesive layer may be provided.

By virtue of using the antireflection film of the present invention as a protective film for polarizing plate, a polarizing plate being excellent in the physical strength and light resistance and having an antireflection function can be produced, and great reduction in the cost and thinning of the display device can be realized.

The polarizing plate of the present invention may also have an optically compensating function. In this case, it is preferred that the antireflection film is used only for one surface side, that is, either the front surface side or the back surface side, out of two surface protective films and the surface protective film on the surface of the polarizing plate opposite the side having the antireflection film is an optically compensatory film.

By producing a polarizing plate where the antireflection film of the present invention is used as one protective film for polarizing plate and an optically compensatory film having optical anisotropy is used as another protective film of the polarizing film, the bright-room contrast and up/down right/left viewing angle of a liquid crystal display device can be more improved.

[Optically Compensatory Film]

A known optically compensatory film may be used but from the standpoint of enlarging the viewing angle, for example, the optically compensatory film described in JP-A-2001-100042 is preferred.

In the case of using an optically compensatory film as a protective film of a polarizing film, the surface on the side laminated to the polarizing film is preferably saponified, and the saponification is preferably performed according to the above-described saponification treatment.

6. Usage Form of Antireflection Film of the Present Invention

The antireflection film of the present invention is used for an image display device such as liquid crystal display (LCD), plasma display panel (PDP), electroluminescent display (ELD) and cathode ray tube display (CRT). The optical filter according to the present invention can be used on a known display such as plasma display panel (PDP) and cathode ray tube display (CRT).

6-(1) Liquid Crystal Display Device

The image display device of the present invention is described below.

The image display device of the present invention comprises either the antireflection film of the present invention or the polarizing plate of the present invention.

That is, the antireflection film or polarizing plate of the present invention can be advantageously used for an image display device such as liquid crystal display and is preferably used as the outermost surface layer of the display.

The liquid crystal display device comprises a liquid crystal cell and two polarizing plates disposed on both sides thereof, and the liquid crystal cell carries a liquid crystal between two electrode substrates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal display device is preferably a TN-, STN-, VA-, ECB-, IPS- or OCB-mode transmissive, reflective or transflective liquid crystal display device.

In particular, the liquid crystal cell is preferably in TN mode, VA mode, OCB mode, IPS mode or ECB mode.

<TN Mode>

In the TN-mode liquid crystal cell, rod-like liquid crystalline molecules are oriented substantially in the horizontal alignment at the time of not applying a voltage and furthermore, twisted at an angle of 60 to 120°.

The TN-mode liquid crystal cell is most frequently utilized as a color TFT liquid crystal display device and is described in many publications.

<VA Mode>

In the VA-mode liquid crystal cell, rod-like liquid crystalline molecules are oriented substantially in the vertical alignment at the time of not applying a voltage.

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) an (MVA-mode) liquid crystal cell where the VA mode is modified into a multi-domain system for enlarging the viewing angle (described in SID97, Digest of Tech. Papers (preprints), 28, 845 (1997)); (3) an (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), pp. 58-59 (1998)); and (4) a SURVAIVAL-mode liquid crystal cell (reported in LCD International 98).

<OCB Mode>

The OCB-mode liquid crystal cell is a liquid crystal cell of bend orientation mode where rod-like liquid crystalline molecules are oriented substantially in the reverse direction (symmetrically) between upper portion and lower portion of the liquid crystal cell, and this is disclosed in U.S. Pat. Nos. 4,583,825 and 5,410,422. Since rod-like liquid crystalline molecules are symmetrically oriented between upper portion and lower portion of the liquid crystal cell, the liquid crystal cell of bend orientation mode has an optically self-compensating ability. Accordingly, this liquid crystal mode is called an OCB (optically compensatory bend) liquid crystal mode. The liquid crystal display device of bend orientation mode is advantageous in that the response speed is fast.

<IPS Mode>

The IPS-mode liquid crystal cell is a system of effecting the switching by applying a transverse electric field to the nematic liquid crystal, and this is described in detail in Proc. IDRC (Asia Display '95), pp. 577-580 and ibid., pp. 707-710.

<ECB Mode>

In the ECB-mode liquid crystal cell, rod-like liquid crystalline molecules are oriented substantially in the horizontal alignment at the time of not applying a voltage. The ECB mode is one of liquid crystal display modes having a simplest structure and is described in detail, for example, in JP-A-5-203946.

6-(2) Display Other than Liquid Crystal Display Device

<PDP>

The plasma display panel (PDP) is generally composed of a gas, a glass substrate, an electrode, an electrode lead material, a thick print material and a fluorescent material. As for the glass substrate, two sheets of front glass substrate and rear glass substrate are used. An electrode and an insulating layer are formed on the two glass substrates, and a fluorescent material layer is further formed on the rear glass substrate. The two glass substrates are assembled, and a gas is sealed therebetween.

The plasma display panel (PDP) is already available on the market. The plasma display panel is described in JP-A-5-205643 and JP-A-9-306366.

In some cases, a front panel is disposed on the front surface of the plasma display panel. The front panel preferably has sufficiently high strength for protecting the plasma display panel. The front panel may be disposed with spacing from the plasma display panel or may be laminated directly to the plasma display body.

In an image display device like the plasma display panel, the optical filter can be laminated directly to the display surface. In the case where a front panel is provided in front of the display, the optical filter may be laminated to the front side (outer side) or back side (display side) of the front panel.

<Touch Panel>

The film of the present invention can be applied to a touch panel and the like described, for example, in JP-A-5-127822 and JP-A-2002-48913.

<Organic EL Device>

The film of the present invention can be used as a protective film of an organic EL device or the like.

In the case of using the film of the present invention for an organic EL device or the like, the contents described, for example, in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056976 may be applied. Furthermore, the contents described in JP-A-2001-148291, JP-A-2001-221916 and JP-A-2001-231443 are preferably used in combination.

EXAMPLES

The present invention is described in greater detail below by referring to Examples, but the present invention should not be construed as being limited thereto.

Example 1

Production of Antireflection Film

Preparation of the coating solution for the formation of each layer and formation of each layer are performed as follows to produce Antireflection Film Nos. 1 to 17.

(Preparation of Coating Solution a for Hardcoat Layer)

The composition shown below is charged into a mixing tank and the resulting solution is stirred to prepare a coating solution for hardcoat layer.

270.0 Parts by mass of poly(glycidyl methacrylate) having a mass average molecular weight of 15,000, 730.0 parts by mass of methyl ethyl ketone, 500.0 parts by mass of cyclohexanone and 50.0 parts by mass of a photopolymerization initiator (Irgacure 184, produced by Ciba Specialty Chemicals Corp.) are added to 750.0 parts by mass of trimethylolpropane triacrylate (VISCOAT #295, produced by Osaka Organic Chemical Industry Ltd.), and the resulting mixture is stirred and filtered through a polypropylene-made filter having a pore size of 0.4 µm to prepare Coating Solution A for Hardcoat Layer.

(Preparation of Coating Solution A for Medium Refractive Index Layer)

1.5 Parts by mass of a mixture of dipentaerythritol pentaacrylate and dipentaerythritol hexaacrylate (DPHA), 0.05 parts by mass of a photopolymerization initiator (Irgacure 907, produced by Ciba Specialty Chemicals Corp.), 66.6 parts by mass of methyl ethyl ketone, 7.7 parts by mass of methyl isobutyl ketone and 19.1 parts by mass of cyclohexanone are added to 5.1 parts by mass of a $ZrO_2$ fine particle-containing hardcoat agent (DESOLITE Z7404 [refractive index: 1.72, solid content concentration: 60 mass %, zirconium oxide fine particle content: 70 mass % (based on solid content), average particle diameter of zirconium oxide fine particle: about 20 nm, solvent composition: MIBK/MEK=9/1, produced by JSR Corp.]), and the resulting mixture is stirred. After well stirring, the obtained solution is filtered through a polypropylene-made filter having a pore size of 0.4 µm to prepare Coating Solution A for Medium Refractive Index Layer.
(Preparation of Coating Solution B for Medium Refractive Index Layer)

4.5 Parts by mass of a mixture of dipentaerythritol pentaacrylate and dipentaerythritol hexaacrylate (DPHA), 0.14 parts by mass of a photopolymerization initiator (Irgacure 184, produced by Ciba Specialty Chemicals Corp.), 66.5 parts by mass of methyl ethyl ketone, 9.5 parts by mass of methyl isobutyl ketone and 19.0 parts by mass of cyclohexanone are added, and the resulting mixture is stirred. After well stirring, the obtained solution is filtered through a polypropylene-made filter having a pore size of 0.4 µm to prepare Coating Solution B for Medium Refractive Index Layer.

Coating Solution A for Medium Refractive Index Layer and Coating Solution B for Medium Refractive Index Layer are mixed each in an appropriate amount to give a refractive index of each sample shown in Table 1, whereby the medium refractive index coating solution for each sample is produced.
(Preparation of Coating Solution A for High Refractive Index Layer)

61.9 Parts by mass of methyl ethyl ketone, 3.4 parts by mass of methyl isobutyl ketone and 1.1 parts by mass of cyclohexanone are added to 15.7 parts by mass of a $ZrO_2$ fine particle-containing hardcoat agent (DESOLITE Z7404 [refractive index: 1.72, solid content concentration: 60 mass %, zirconium oxide fine particle content: 70 mass % (based on solid content), average particle diameter of zirconium oxide fine particle: about 20 nm, solvent composition: MIBK/MEK=9/1, produced by JSR Corp.]), and the resulting mixture is stirred. The obtained solution is filtered through a polypropylene-made filter having a pore size of 0.4 µm to prepare Coating Solution A for High Refractive Index Layer.
(Preparation of Coating Solution B for High Refractive Index Layer)

3.0 Parts by mass of an ATO dispersed hardcoat agent, Peltron C-4456-S7 (solid content: 45%), trade name, produced by Nippon Pelnox Corp., 61.9 parts by mass of methyl ethyl ketone, 3.4 parts by mass of methyl isobutyl ketone and 1.1 parts by mass of cyclohexanone are added to 12.0 parts by mass of a $ZrO_2$ fine particle-containing hardcoat agent (DESOLITE Z7404 [refractive index: 1.72, solid content concentration: 60 mass %, zirconium oxide fine particle content: 70 mass % (based on solid content), average particle diameter of zirconium oxide fine particle: about 20 nm, solvent composition: MIBK/MEK=9/1, produced by JSR Corp.]), and the resulting mixture is stirred. The obtained solution is filtered through a polypropylene-made filter having a pore size of 0.4 µm to prepare Coating Solution B for High Refractive Index Layer.
(Preparation of Coating Solution C for High Refractive Index Layer)

Coating Solution A for High Refractive Index Layer described in Examples of JP-A-2006-17970, paragraph [0169], is used as Coating Solution C for High Refractive Index Layer.
(Preparation of Coating Solution D for High Refractive Index Layer)

0.75 Parts by mass of a mixture of dipentaerythritol pentaacrylate and dipentaerythritol hexaacrylate (DPHA), 62.0 parts by mass of methyl ethyl ketone, 3.4 parts by mass of methyl isobutyl ketone and 1.1 parts by mass of cyclohexanone are added to 14.4 parts by mass of a $ZrO_2$ fine particle-containing hardcoat agent (DESOLITE Z7404 [refractive index: 1.72, solid content concentration: 60 mass %, zirconium oxide fine particle content: 70 mass % (based on solid content), average particle diameter of zirconium oxide fine particle: about 20 nm, photopolymerization initiator contained, solvent composition: MIBK/MEK=9/1, produced by JSR Corp.]), and the resulting mixture is stirred. After well stirring, the obtained solution is filtered through a polypropylene-made filter having a pore size of 0.4 µm to prepare Coating Solution D for High Refractive Index Layer.
(Preparation of Coating Solution for Low Refractive Index Layer)
(Synthesis of Perfluoroolefin Copolymer (1))

Perfluoroolefin Copolymer (1):

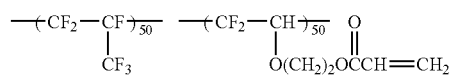

In the structural formula above, 50:50 indicates a molar ratio.

In a stainless steel-made autoclave having an inner volume of 100 ml and equipped with a stirrer, 40 ml of ethyl acetate, 14.7 g of hydroxyethyl vinyl ether and 0.55 g of dilauroyl peroxide are charged, and the inside of the system is degassed and displaced with nitrogen gas. Furthermore, 25 g of hexafluoropropylene (HFP) is introduced into the autoclave, and the temperature is elevated to 65° C. The pressure when the temperature in the autoclave reaches 65° C. is 0.53 MPa (5.4 kg/cm²). The reaction is continued for 8 hours while keeping this temperature and when the pressure reaches 0.31 MPa (3.2 kg/cm²), the heating is stopped and the system is allowed to cool. At the time when the inner temperature drops to room temperature, the unreacted monomer is expelled and the autoclave is opened to take out the reaction solution. The obtained reaction solution is poured in a large excess of hexane and after removing the solvent by decantation, the precipitated polymer is taken out. This polymer is dissolved in a small amount of ethyl acetate, and the residual monomer is completely removed by performing reprecipitation twice from hexane. After drying, 28 g of a polymer is obtained. Subsequently, 20 g of this polymer is dissolved in 100 ml of N,N-dimethylacetamide, and 11.4 g of acrylic acid chloride is added dropwise thereto under ice cooling, followed by stirring at room temperature for 10 hours. Thereafter, ethyl acetate is added to the reaction solution, and the resulting solution is washed with water. The organic layer is extracted and then concentrated, and the obtained polymer is reprecipitated from hexane to obtain 19 g of Perfluoroolefin Copolymer (1). The refractive index of the obtained polymer is 1.422.
(Preparation of Sol Solution a)

In a reaction vessel equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethyl acetate (Kerope EP-12, trade name, produced by Hope Chemical Co., Ltd.) are added and mixed and after adding 31 parts of ion-exchanged water, the reaction is allowed to proceed at 61° C. for 4 hours. The reaction solution is then cooled to room temperature to obtain Sol Solution a. The mass average molecular weight is 1,620 and out of the oligomer or higher components, the proportion of the components having a molecular weight of 1,000 to 20,000 is 100%. Also, from the gas chromatography analysis, it is revealed that the raw material acryloyloxypropyltrimethoxysilane does not remain at all.

(Preparation of Hollow Silica Fine Particle Liquid Dispersion)

30.5 Parts of acryloyloxypropyltrimethoxysilane and 1.51 parts of diisopropoxyaluminum ethyl acetate are added to 500 parts of a hollow silica fine particle sol (isopropyl alcohol silica sol, CS60-IPA, produced by Catalysts & Chemicals Ind. Co., Ltd., average particle diameter: 60 nm, thickness of shell: 10 nm, silica concentration: 20%, refractive index of silica particle: 1.31) and mixed, and 9 parts of ion-exchanged water is added thereto. After allowing the reaction to proceed at 60° C. for 8 hours, the reaction solution is cooled to room temperature, and 1.8 parts of acetyl acetone is added to obtain a liquid dispersion. Thereafter, solvent replacement by reduced-pressure distillation is performed under a pressure of 30 Torr while adding cyclohexanone to keep almost constant the silica content, and after adjustment of the concentration, a liquid dispersion having a solid content concentration of 18.2% is finally obtained. The amount of IPA remaining in the obtained liquid dispersion is analyzed by gas chromatography and found to be 0.5% or less.

Using the obtained hollow silica particle liquid dispersion or sol solution, a composition according to the following formulation is mixed. The obtained solution is stirred and then filtered through a polypropylene-made filter having a pore size of 1 μm. In this way, Coating Solutions A to D for Low Refractive Index Layer are prepared.

(Formulation of Coating Solution A for Low Refractive Index Layer)

| | |
|---|---|
| DPHA | 14.5 g |
| P-1 | 24.5 g |
| Hollow Silica Particle Liquid Dispersion (18.2%) | 302.2 g |
| RMS-033 | 5.0 g |
| Irgacure 907 | 1.0 g |
| MEK | 1750 g |
| Cyclohexanone | 223.0 g |

(Formulation of Coating Solution B for Low Refractive Index Layer)

| | |
|---|---|
| Opstar JN7228A (6%) | 250.0 g |
| Hollow Silica Particle Liquid Dispersion (18.2%) | 151.1 g |
| Sol Solution a | 18.9 g |
| MEK | 485 g |
| Cyclohexanone | 95 g |

(Formulation of Coating Solution (C) for Low Refractive Index Layer)

In a flask, 2.95 g of trifluoropropyltrimethoxysilane, 5.9 g of tridecafluorooctyltrimethoxysilane, 50.2 g of tetraethoxysilane, 5.9 g of isobutanol, 0.18 g of aluminum acetylacetonate and 1.48 g of a silane coupling agent "KBM-5103" {3-acryloxypropyltrimethoxysilane, produced by Shin-Etsu Chemical Co., Ltd.} are charged and stirred. Subsequently, 14.8 g of 0.25 mol/L aqueous acetic acid is added dropwise little by little. After the completion of dropwise addition, the resulting solution is stirred at room temperature for 3 hours, and 0.89 g of a silicone-based leveling agent "L-9000 (CS100)" {a linear dimethylsilicone-EO block copolymer, produced by Nippon Unicar Co., Ltd.} is added. Furthermore, 294 g of a hollow silica particle dispersion "CS60-IPA" {particle size: 60 nm, thickness of shell: 10 nm, refractive index: 1.31, solid content concentration: 20%, main solvent: isopropyl alcohol, produced by Catalysts & Chemicals Ind. Co., Ltd.} is added and after stirring, the resulting solution is multi-stage filtered through polypropylene-made filters having a pore size of 30 μm, 10 μm and 1 μm to prepare Coating Composition (C) for the formation of the low refractive index layer.

(Formulation of Coating Solution D for Low Refractive Index Layer)

| | |
|---|---|
| Opstar JN7228A (6%) | 13.0 g |
| MEK-ST-L (solid content: 30 mass %) | 2.0 g |
| Sol Solution a | 0.6 g |
| MEK | 5.6 g |
| Cyclohexanone | 0.6 g |

The compounds used are shown below.
P-1: Perfluoroolefin Copolymer (1)
DPHA: A mixture of dipentaerythritol pentaacrylate and dipentaerythritol hexaacrylate (produced by Nippon Kayaku Co., Ltd.).
Hollow Silica Particle Liquid Dispersion: Hollow silica particle sol surface-modified with the above-described acryloyloxypropyltrimethoxysilane, solid content concentration: 18.2%.
MEK: Methyl ethyl ketone
RMS-033: A reactive silicone (produced by Gelest)
Irgacure 907: Photopolymerization initiator (produced by Ciba Specialty Chemicals Corp.)
Opstar JN7228A: Thermally crosslinking fluorine-containing polymer [refractive index: 1.42, solid content concentration: 6%, produced by JSR Corp.]
"MEK-ST-L: Silica sol (silica having an average particle diameter of 45 nm, solid content concentration: 30 mass %, produced by Nissan Chemicals Industries, Ltd.)
(Production of Hardcoat Layer A)

On a triacetyl cellulose film (TD80UF, produced by Fujifilm Corp., refractive index: 1.48) having a thickness of 80 μm as a transparent support, the coating solution for hardcoat layer in the formulation above is coated using a gravure coater and dried at 100° C. Thereafter, the coated layer is cured by irradiating an ultraviolet ray at an illuminance of 400 mW/cm² and an irradiation dose of 150 mJ/cm² with use of an air-cooled metal halide lamp (manufactured by Eye Graphics Co., Ltd.) of 160 W/cm while purging the system with nitrogen to give an atmosphere having an oxygen concentration of 1.0 vol % or less, whereby Hardcoat Layer A of 12 μm in thickness is formed.

On thus-formed Hardcoat Layer A, the coating solution for medium refractive index layer, the coating solution for high refractive index layer and the coating solution for low refractive index layer each prepared to have a desired refractive index are coated using a gravure coater. Incidentally, the refractive index of each layer is measured by Multi-Wavelength Abbe Refractometer DR-M2 (manufactured by ATAGO K.K.) after coating the coating solution for each layer on a glass plate to a thickness of about 4 μm. A refractive index measured using a filter, "Interference Filter 546(e) nm for DR-M2, M4, Parts No. RE-3523", is employed as the refractive index at a wavelength of 550 nm. The thickness of the medium refractive index layer, the high refractive index layer and the low refractive index layer after coating the coating solution for each layer on a glass plate are measured by a reflection spectral film thickness meter (FE-3000 (trade name) of Otsuka Denshi Co., Ltd.). The refractive indexes of these layers are obtained by the Abbe Refractometer for determination of the thickness of these layers.

The drying conditions of the medium refractive index layer are 90° C. and 30 seconds, and the ultraviolet curing conditions are such that an air-cooled metal halide lamp (manufactured by Eye Graphics Co., Ltd.) of 180 W/cm is used at an illuminance of 300 mW/cm$^2$ and an irradiation dose of 240 mJ/cm$^2$ while purging the system with nitrogen to give an atmosphere having an oxygen concentration of 1.0 vol % or less.

The refractive index and layer thickness of the medium refractive index layer after curing are varied as shown in Table 1.

The drying conditions of the high refractive index layer are 90° C. and 30 seconds, and the ultraviolet curing conditions are such that an air-cooled metal halide lamp (manufactured by Eye Graphics Co., Ltd.) of 240 W/cm is used at an illuminance of 300 mW/cm$^2$ and an irradiation dose of 240 mJ/cm$^2$ while purging the system with nitrogen to give an atmosphere having an oxygen concentration of 1.0 vol % or less. The refractive index and layer thickness of the high refractive index layer after curing are as shown in Table 1.

(Production of Low Refractive Index Layer A)

The drying conditions of the low refractive index layer are 90° C. and 30 seconds, and the ultraviolet curing conditions are such that an air-cooled metal halide lamp (manufactured by Eye Graphics Co., Ltd.) of 240 W/cm is used at an illuminance of 600 mW/cm$^2$ and an irradiation dose of 600 mJ/cm$^2$ while purging the system with nitrogen to give an atmosphere having an oxygen concentration of 0.1 vol % or less.

(Production of Low Refractive Index Layer B)

The curing conditions of the low refractive index layer are shown below.

(1) Drying: 80° C.-120 sec
(2) Curing: 110° C.-10 min
(3) UV Curing:

60° C.-1 min; an air-cooled metal halide lamp (manufactured by Eye Graphics Co., Ltd.) of 240 W/cm is used at an illuminance of 120 mW/cm$^2$ and an irradiation dose of 480 mJ/cm$^2$ while purging the system with nitrogen to give an atmosphere having an oxygen concentration of 0.01 vol % or less.

(Production of Low Refractive Index Layer C)

Isophorone diisocyanate in an amount of 1 mass % based on the solid content (residue after the volatile organic solvent is evaporated) of Coating Solution (C) for Low Refractive Index Layer is mixed with Coating Solution (C) immediately before coating, and the resulting solution is coated by an extrusion coater on the hardcoat layer formed above, dried at 80° C. for 5 minutes, further cured at 12° C. for 20 minutes and then irradiated with an ultraviolet ray at an illuminance of 400 mW/cm$^2$ and an irradiation dose of 200 mJ/cm$^2$ by using an air-cooled metal halide lamp (manufactured by Eye Graphics Co., Ltd.) of 240 W/cm under nitrogen purging to form a low refractive index layer of 89 nm in thickness. The obtained film is taken up.

(Production of Low Refractive Index Layer D)

Low Refractive Index Layer D is produced under the same curing conditions as those for Low Refractive Index Layer B.

(Production of Low Refractive Index Layer E)

Low Refractive Index Layer E is produced thoroughly in the same manner as that using Coating Solution (B) except for changing the amounts of Opstar JN7228A, hollow silica particle liquid dispersion and hollow silica liquid dispersion in Coating Solution (B) for Low Refractive Index Layer to 50.0 g, 350.0 g and 300.0 g, respectively.

The coating solution, refractive index and layer thickness of each of Antireflection Films 1 to 17 produced by the above-described methods are shown in Table 1. Antireflection Film Sample Nos. 1 to 4 and 10 are samples of the present invention and the others are comparative samples.

TABLE 1

| Antireflection Film Sample No. | Hardcoat | Low Refractive Index Layer | | | High Refractive Index Layer | | | Medium Refractive Index Layer | | Remarks |
|---|---|---|---|---|---|---|---|---|---|---|
| | | Coating Solution | Refractive Index | Thickness (nm) | Coating Solution | Refractive Index | Thickness (nm) | Refractive Index | Thickness (nm) | |
| 1 | A | A | 1.36 | 90 | A | 1.72 | 110 | 1.62 | 60 | Invention |
| 2 | A | A | 1.36 | 90 | B | 1.71 | 110 | 1.62 | 60 | Invention |
| 3 | A | B | 1.34 | 91 | B | 1.71 | 110 | 1.62 | 60 | Invention |
| 4 | A | C | 1.37 | 89 | A | 1.72 | 110 | 1.62 | 60 | Invention |
| 5 | A | D | 1.42 | 86 | C | 1.85 | 101 | 1.64 | 60 | Comparison |
| 6 | A | A | 1.36 | 101 | A | 1.72 | 80 | 1.64 | 82 | Comparison |
| 7 | A | D | 1.42 | 88 | C | 1.85 | 73 | 1.7 | 60 | Comparison |
| 8 | A | D | 1.42 | 95 | C | 1.85 | 71 | 1.64 | 81 | Comparison |
| 9 | A | D | 1.42 | 95 | C | 1.85 | 142 | 1.64 | 81 | Comparison |
| 10 | A | A | 1.36 | 91 | A | 1.72 | 109 | 1.63 | 61 | Invention |
| 11 | A | A | 1.36 | 95 | A | 1.72 | 110 | 1.62 | 60 | Comparison |
| 12 | A | A | 1.36 | 90 | B | 1.71 | 100 | 1.62 | 60 | Comparison |
| 13 | A | A | 1.36 | 90 | A | 1.72 | 110 | 1.62 | 65 | Comparison |
| 14 | A | E | 1.30 | 92 | A | 1.72 | 110 | 1.62 | 60 | Comparison |
| 15 | A | A | 1.36 | 90 | D | 1.68 | 117 | 1.62 | 60 | Comparison |
| 16 | A | A | 1.36 | 90 | B | 1.71 | 110 | 1.55 | 64 | Comparison |
| 17 | A | A | 1.36 | 90 | A | 1.72 | 110 | 1.65 | 57 | Comparison |

(Evaluation of Antireflection Film)

Various properties of the antireflection film are evaluated by the following methods. The results are shown in Table 2.

(1) Specular Reflectivity, Color Tint, and Color Difference at Fluctuation of Film Thickness The antireflection property is evaluated by mounting an adapter ARV-474 on a spectrophotometer V-550 (manufactured by JASCO Corp.), measuring the specular reflectivity for the outgoing angle of 5° at an incident angle of 5° in the wavelength region of 380 to 780 nm, and calculating the average reflectivity at 450 to 650 nm. Furthermore, the color tint of reflected light is evaluated by calculating, from the reflection spectrum measured, the L*, a* and b* values of the CIE1976 L*a*b* color space, which are values indicating the color tint of regularly reflected light for incident light at 5° of a CIE standard illuminant D65. The color tint (L*', a*', b*') of reflected light when the thickness of an arbitrary layer out of the low refractive index layer, high refractive index layer and medium refractive index layer is changed by 2.5% is measured, the color difference ΔE from the color tint (L*, a*, b*) of reflected light with the designed thickness is determined, and the value giving the maximum color difference is calculated and used for the evaluation of color difference at the fluctuation of the layer thickness.

$$\Delta E = \{(L^* - L^{*\prime})^2 + (a^* - a^{*\prime})^2 + (b^* - b^{*\prime})^2\}^{1/2}$$

(2) Measurement of Surface Resistance Value

About all samples, the sample is left standing under the conditions of 25° C. and 60% RH for 2 hours and thereafter, the surface resistance value (SR) is measured under the same conditions by a circular electrode method. In Table 2, the surface resistance value is shown by its logarithm (log SR).

(3) Evaluation of Dust Attachment

The transparent support side of the antireflection film is laminated on the CRT surface, and the device is used for 24 hours in a room having from 100 to 2,000,000 dusts and tissue paper scraps of 0.5 μm or more per 1 ft³ (cubic feet). The number of dusts and tissue paper scrapes attached per 100 cm² of the antireflection film is measured, and the sample is rated A when the average value of the results is less than 20 pieces, rated B when from 20 to 49 pieces, rated C when from 50 to 199 pieces, and rated D when 200 pieces or more.

(4) Light Resistance

Evaluation of Light Resistance:

Each antireflection film is exposed to a sunshine carbon arc lamp at a relative humidity of 60% for 200 hours by using a sunshine weather meter (S-80, manufactured by Suga Test Instruments Co., Ltd.) and then subjected to humidity conditioning under the conditions of a temperature of 25° C. and a relative humidity of 60% for 2 hours.

The antireflection film surface on the side having the high refractive index layer is incised with a cutter knife to form 11 longitudinal lines and 11 transverse lines in a grid pattern and thereby define 100 squares in total, and an adhesion test is repeated three times on the same site by press-bonding a polyester pressure-sensitive adhesive tape (No. 31B) produced by Nitto Denko Corp. The presence or absence of separation is observed with an eye, and the light resistance is evaluated on a scale of the following 4 ratings.

A: Separation is not observed at all in 100 squares.

B: Separation is not observed at all in 100 squares but when observed through a microscope, fine separation is observed in the cut edge.

C: The number of squares separated out of 100 squares is 10 or less.

D: The number of squares separated out of 100 squares is more than 10.

TABLE 2

| Antireflection Sample No. | Average Reflectance | a* | b* | Log SR | Dust Attachment | Color Difference at Fluctuation of Layer Thickness | Light Resistance | Remarks |
|---|---|---|---|---|---|---|---|---|
| 1 | 0.34 | 1.69 | −0.76 | >14 | B | 2.52 | A | Invention |
| 2 | 0.34 | 1.69 | −0.76 | 10.6 | A | 2.52 | A | Invention |
| 3 | 0.28 | 2.01 | −0.91 | 10.5 | A | 2.73 | A | Invention |
| 4 | 0.41 | 1.27 | −0.62 | >14 | B | 2.38 | A | Invention |
| 5 | 0.20 | 1.64 | −0.84 | >14 | B | 3.36 | C | Comparison |
| 6 | 0.24 | 12.44 | −18.74 | >14 | B | 6.67 | A | Comparison |
| 7 | 0.34 | −1.4 | 0.51 | >14 | B | 3.07 | C | Comparison |
| 8 | 0.38 | 16.9 | −23.6 | >14 | B | 6.49 | C | Comparison |
| 9 | 0.61 | 5.91 | −4.46 | >14 | B | 4.92 | C | Comparison |
| 10 | 0.23 | 2.05 | −0.47 | >14 | B | 2.98 | A | Invention |
| 11 | 0.17 | 3.84 | −4.94 | >14 | B | 7.87 | A | Comparison |
| 12 | 0.19 | 1.20 | 0.63 | 10.5 | A | 3.17 | A | Comparison |
| 13 | 0.27 | 3.20 | −0.33 | >14 | B | 3.78 | A | Comparison |
| 14 | 0.31 | 4.82 | −3.53 | >14 | B | 3.42 | A | Comparison |
| 15 | 0.40 | 0.69 | 3.47 | >14 | B | 2.97 | A | Comparison |
| 16 | 0.18 | 8.20 | −3.68 | 10.5 | A | 2.75 | A | Comparison |
| 17 | 0.27 | −0.09 | 1.53 | >14 | B | 2.88 | A | Comparison |

As seen from Table 2, in Samples Nos. 1 to 4 and 10 of the present invention where the medium refractive index layer has a refractive index of 1.60 to 1.64 and a thickness of 58.5 to 61.5 nm, the high refractive index layer has a refractive index of 1.70 to 1.74 and a thickness of 107.5 to 112.5 nm, and the low refractive index layer has a refractive index of 1.32 to 1.37 and a thickness of 88.0 to 92.0 nm, an antireflection film ensuring that the reflectance is as low as 0.5%, the color tint of reflected light is neutral of 0≤a*≤8 and −10≤b*≤0, and the color difference when the thickness of an arbitrary layer out of the low refractive index layer, high refractive index layer and medium refractive index layer is shifted by ±2.5% from the designed thickness is as small as ΔE≤3, is obtained. In Sample Nos. 2 and 3 where an electrically conductive substance is added, an antireflection film having log SR≤12 and also exhibiting enhanced suppression of dust attachment is obtained. In Sample Nos. 5 and 7 to 9 where a titanium dioxide particle is used in the high refractive index layer, the light resistance is slightly poor, but in Sample Nos. 1 to 4 and 10 of the present invention using a zirconium oxide particle, an antireflection film having good light resistance is obtained. Furthermore, the high refractive index layer of conventional design usually uses a titanium oxide fine particle and has a refractive index of 1.75 or more and it is revealed that these samples are greatly inferior to the present invention in terms of weather resistance and color tint.

Example 2

Seventeen antireflection films produced in Example 1 each is dipped in an aqueous 2.0 mol/L NaOH aqueous solution at 55° C. for 2 minutes to saponify the triacetyl cellulose surface which is the back surface of the film, and a 80 μm-thick triacetyl cellulose film (TAC-TD80U, produced by Fujifilm Corp.) is saponified under the same conditions. A polarizing film is produced by adsorbing iodine to a stretched polyvinyl alcohol film, and one side of the polarizing film is laminated to the saponified antireflection film of Example 1 by using a polyvinyl alcohol-based adhesive such that the transparent support (triacetyl cellulose) side of the antireflection film becomes the polarizing film side. A viewing angle-enlarging film having an optically compensatory layer, "Wide View Film SA12B" {produced by Fujifilm Corp.} is saponified and laminated to another side of the polarizing film by using a polyvinyl alcohol-based adhesive. In this way, a polarizing plate is produced. In place of the viewing-side polarizing plate provided in a TN-mode 20-inch liquid crystal display device, Model TH-20TA3 (manufactured by Matsushita Electric Industrial Co., Ltd.), one polarizing plate of the present invention is laminated to the viewer side through an acrylic pressure-sensitive adhesive such that the optically anisotropic layer comes to the liquid crystal cell side, whereby a polarizing plate is obtained.

Incidentally, in Sample No. 18, TD80UL where an antireflection film is not formed on the surface is used in place of the antireflection film. The projection and color tint are evaluated in a bright room by reflecting white cloths on the <display displayed black> and judged according to the following criteria. The results are shown in Table 3.

(Criteria of Projection)
A: Not bothersome or when carefully viewed, bothersome.
B: Slightly bothersome.
C: Bothersome.

(Criteria of Color Tint)
A: Not bothersome.
B: Slightly bothersome.
C: Bothersome.

(Criteria of Color Unevenness Throughout Screen)
A: Color difference is not recognized or even when recognized, not bothersome.
B: Color difference is conspicuous and bothersome.
C: Color difference is extremely conspicuous and in a problematic level.

TABLE 3

| Sample No. | Antireflection Film Sample No. | Projection | Color Tint | Color Unevenness | Remarks |
| --- | --- | --- | --- | --- | --- |
| 1 | 1 | A | A | A | Invention |
| 2 | 2 | A | A | A | Invention |
| 3 | 3 | A | A | A | Invention |
| 4 | 4 | A | A | A | Invention |
| 5 | 5 | A | A | B | Comparison |
| 6 | 6 | A | C | C | Comparison |
| 7 | 7 | A | B | B | Comparison |
| 8 | 8 | A | C | C | Comparison |
| 9 | 9 | B | A | C | Comparison |
| 10 | 10 | A | A | A | Invention |
| 11 | 11 | A | A | C | Comparison |
| 12 | 12 | A | B | B | Comparison |
| 13 | 13 | A | A | B | Comparison |
| 14 | 14 | A | A | B | Comparison |
| 15 | 15 | A | B | A | Comparison |
| 16 | 16 | A | B | A | Comparison |
| 17 | 17 | A | B | A | Comparison |
| 18 | none | C | A | A | Comparison |

As seen from Table 3, in Sample Nos. 1 to 4 of the present invention, an image display device with very high display quality, where the projection of scene in back is very little, the color tint of reflection is not bothersome, and the color unevenness is inconspicuous, is obtained.

Example 3

The samples of Example 1 each is laminated to the outermost surface on the viewing side of OCB-type liquid crystal display devices described in Examples 10, 15, 18 and 19 of JP-A-2000-154261 by using a polyvinyl alcohol-based adhesive. In Sample Nos. 1 to 4 of the present invention, a liquid crystal display device with very high display quality, where the projection of scene in back is very little, the color tint of reflection is not bothersome, the bright-room contrast is high, the viewing angle in the up/down and right/left directions is very wide, the visibility is remarkably excellent, and the color tint of reflection is not annoying, is obtained.

Example 4

In place of the surface protective film on the viewing side provided in a VA-mode 22-inch liquid crystal display device, Model TH22-LH10 (manufactured by Matsushita Electric Industrial Co., Ltd.), the samples of Example 1 each is laminated by using a polyvinyl alcohol-based adhesive. In Sample Nos. 1 to 4 of the present invention, a liquid crystal display device with very high display quality, where the projection of scene in back is very little, the color tint of reflection is not bothersome, the bright-room contrast is high, the visibility is remarkably excellent, and the color tint of reflection is not annoying, is obtained.

Example 5

In place of the surface protective film on the viewing side provided in an IPS-mode 20-inch liquid crystal display device, Model W20-1c3000 (manufactured by Hitachi, Ltd.), the samples of Example 1 each is laminated by using a polyvinyl alcohol-based adhesive. In Sample Nos. 1 to 4 of the present invention, a liquid crystal display device with very high display quality, where the projection of scene in back is very little, the color tint of reflection is not bothersome, the bright-room contrast is high, the visibility is remarkably excellent, and the color tint of reflection is not annoying, is obtained.

Example 6

The antireflection film produced in Example 1 is laminated to the glass plate on the surface of an organic EL display device through a pressure-sensitive adhesive, as a result, in Sample Nos. 1 to 4 of the present invention, a display device where the reflection on the glass surface is reduced, the visibility is high, and the color tint of reflection is not annoying, is obtained.

Example 7

A hardcoat/a medium refractive index layer/a high refractive index layer/a low refractive index layer are formed in the same manner as in Antireflection Film No. 1 of Example 1 except that a 188 μm-thick polyethylene terephthalate film having on one surface thereof an undercoat layer (COSMO-SHINE A4100, produced by Teijin, Ltd., refractive index: 1.65) is used as the transparent substrate film and respective layers are formed on the undercoat surface thereof, and the antireflection film is subjected to the same evaluations as in Example 1. The color tint of reflected light is remarkably reduced, the pencil hardness is very high, and when the surface film of each of a flat CRT and a 42-inch plasma display without a front panel (direct color filter system, PDU-42H6A1, manufactured by Pioneer Corp.) is removed and the optical film is laminated by a pressure-sensitive adhesive, display devices satisfying all of low reflection, reduction in color tint of reflected light, and high film hardness are obtained.

Example 8

A hardcoat/a medium refractive index layer/a high refractive index layer/a low refractive index layer are formed in the same manner as in Antireflection Film No. 1 of Example 1 except that in Cellulose Acylate Film (CA1-1) of Example 1 of JP-A-2005-156642, Cellulose Acylate Solution (A-1) having the same composition is used, a casting band of 4 m in width is used, Cellulose Acylate Film (CA1-1W) having a length of 3,500 m, a width of 2,200 mm and a thickness of 40 μm is used as the transparent substrate film and respective layers are formed on the undercoat surface thereof, and this antireflection film is subjected to the same evaluations as in Example 1. It is confirmed that in Sample Nos. 1 to 4 of the present invention, an antireflection film enabling remarkable reduction in the color tint of reflected light and less generation of curling is obtained.

Example 9

A hardcoat/a medium refractive index layer/a high refractive index layer/a low refractive index layer are formed by the same method as for Antireflection Film No. 1 of Example 1 in the same manner as in Antireflection Film No. 1 of Example 1 except that in Cellulose Acylate Film (CA2) of Example 2 of JP-A-2005-156642, the plasticizer used for Cellulose Acylate Solution (A-2) is changed to a 1:1 mixture of the same amounts of ethyl hexyl phthalate (EHP) and tricyclohexyl O-acetylcitrate (OACTCy), a rotary drum casting machine is used, Cellulose Acylate Film (CA2-2W) having a length of 2,500 in, a width of 2,200 mm and a thickness of 78 μm is used as the transparent substrate film and respective layers are formed on the undercoat surface thereof, and this antireflection film is subjected to the same evaluations as in Example 1. It is confirmed that in Sample Nos. 1 to 4 of the present invention, an antireflection film enabling remarkable reduction in the color tint of reflected light and reflection with neutral color tint is obtained.

The antireflection film of the present invention has a low reflectance, causes less change in the color tint of reflected light due to fluctuation in the layer thickness, and therefore, ensures that the difference in reflected color among finished products is small, the coating unevenness, streak and the like are hardly perceived, and the productivity is high. Furthermore, in an image display device using this antireflection film, projection of outside light is suppressed to ensure high contrast and even when outside light is projected, the visibility is excellent because the reflected light is uniform.

Accordingly, the antireflection film of the present invention can be used for various display devices, for example, as a polarizing plate used for liquid crystal display devices of various modes, a surface film used for organic EL devices, and a surface protective plate for flat CRT or PDP applied to PET film.

The entire disclosure of each and every foreign patent application from which the benefit of foreign priority has been claimed in the present application is incorporated herein by reference, as if fully set forth.

What is claimed is:
1. An antireflection film comprising, in a following order:
a transparent substrate film;
a medium refractive index layer;
a high refractive index layer; and
a low refractive index layer,
wherein
the medium refractive index layer is (A) a medium refractive index layer having a refractive index of 1.60 to 1.64 at a wavelength of 550 nm and a thickness of 55.0 to 65.0 nm,
the high refractive index layer is (B) a high refractive index layer having a refractive index of 1.70 to 1.74 at a wavelength of 550 nm and a thickness of 105.0 to 115.0 nm,
the low refractive index layer is (C) a low refractive index layer having a refractive index of 1.32 to 1.37 at a wavelength of 550 nm and a thickness of 85.0 to 95.0, and
the color tint of regularly reflected light for 5° incident light in the wavelength region 380-780 nm of a CIE standard illuminant D65 satisfies the conditions that a* and b* values of the CIE(1976) L*a*b* color space are in the ranges 0≤a*≤2.05 and −10≤b*≤0 while the color difference at fluctuation of layer thickness is less than 2.98, wherein the color difference is measured according to the following equation:

wherein L*', a*', b*' are values of the color tint of reflected light when the thickness of an arbitrary layer out of the low refractive index layer, high refractive index layer and medium refractive index layer is changed by 2.5% is measured.

2. The antireflection film according to claim 1, wherein the low refractive index layer comprises at least one kind of inorganic fine particle.

3. The antireflection film according to claim 1, wherein the low refractive index layer comprises at least one kind of hollow particle having a refractive index of 1.17 to 1.40.

4. The antireflection film according to claim 1, wherein the low refractive index layer is a layer formed by curing a composition that comprises a fluorine-containing curable resin having a heat-curable or/and an ionizing radiation-curable property.

5. The antireflection film according to claim 1, wherein the low refractive index layer is a layer formed by curing a composition that comprises at least either a hydrolysate of an organosilyl compound or a partial condensate of the hydrolysate, the origanosilyl compound being represented by a following formula (I):

$$R^{11}{}_m Si(X^{11})_n \qquad \text{Formula (I)}$$

wherein $X^{11}$ represents —OH, a halogen atom, an —OR$^{12}$ group or an —OCOR$^{12}$ group, R$^{11}$ represents an alkyl group, an alkenyl group or an aryl group, R$^{12}$ represents an alkyl group, m+n is 4, and m and n each is a positive integer.

6. The antireflection film according to claim 1, wherein at least one layer of the high refractive index layer and the medium refractive index layer is formed by
coating a coating composition that comprises an inorganic fine particle containing an oxide of at least one metal selected from the group consisting of Ti, Zr, In, Zn, Sn, Sb and Al; a curable resin having a trifunctional or greater polymerizable group; a solvent; and a polymerization initiator,
drying the solvent, and
curing the coating composition by either one or both of heating and irradiation with ionizing radiation.

7. The antireflection film according to claim 6, wherein the inorganic fine particle contained in at least one layer of the high refractive index layer and the medium refractive index layer mainly comprises a zirconium oxide having an average particle diameter of 1 nm to 120 nm.

8. The antireflection film according to claim 1, wherein at least one layer of the medium refractive index layer, the high refractive index layer and the low refractive index layer is an electrically conductive layer having a resistance value (SR) satisfying a following formula (4):

Log $SR \leq 12$. Formula (4)

9. The antireflection film according to claim 1, further comprising:
an electrically conductive layer between the transparent substrate film and the medium refractive index layer, which has a resistance value (SR) satisfying a following formula (4):

Log $SR \leq 12$. Formula (4)

10. The antireflection film according to claim 1, further comprising:
a hardcoat layer having a thickness of 1 μm to 30 μm between the transparent substrate film support and the medium refractive index layer.

11. A polarizing plate comprising:
a polarizer; and
two surface protective films, between which the polarizer is sandwiched,
wherein one of the two surface protective films is the antireflection film according to claim 1.

12. The polarizing plate according to claim 11, wherein the other one of the two surface protective films is an optically compensatory film.

13. An image display device comprising: the antireflection film according to claim 1.

14. An image display device comprising: the polarizing plate according to claim 11, wherein the image display device is a TN-, STN-, VA-, ECB-, IPS- or OCB-mode transmissive, reflective or transflective liquid crystal display device.

15. The antireflection film of claim 1, wherein the color tint of regularly reflected light for 5° incident light in the wavelength region 380-780 nm of a CIE standard illuminant D65 satisfies the conditions that a* and b* values of the CIE(1976) L*a*b* color space are in the ranges $0 \leq a^* \leq 2.05$ and $-0.91 \leq b^* \leq 0$ while the color difference at fluctuation of layer thickness is less than 2.98.

* * * * *